US006609097B2

(12) United States Patent
Costello et al.

(10) Patent No.: US 6,609,097 B2
(45) Date of Patent: Aug. 19, 2003

(54) BROADCAST PROGRAM CAPTURE AND PLAYBACK ENHANCEMENT SIGNAL STRUCTURE, RECEIVER, AND METHOD

(75) Inventors: Edward J. Costello, Pleasanton, CA (US); Albert W. Wegener, Portola Valley, CA (US); Thomas M. Linden, Los Gatos, CA (US); Serge Swerdlow, Palo Alto, CA (US)

(73) Assignee: Command Audio Corporation, Redwood City, CA (US)

( * ) Notice: Subject to any disclaimer, the term of this patent is extended or adjusted under 35 U.S.C. 154(b) by 0 days.

(21) Appl. No.: 10/126,642

(22) Filed: Apr. 19, 2002

(65) Prior Publication Data

US 2002/0184038 A1 Dec. 5, 2002

Related U.S. Application Data

(63) Continuation of application No. 09/630,053, filed on Aug. 1, 2000, now abandoned.

(51) Int. Cl.[7] .............................. H04J 3/02; H04H 1/00; H04L 1/00

(52) U.S. Cl. .............................. 704/500; 370/474; 714/6

(58) Field of Search .............................. 704/500; 370/464, 370/469, 473, 476, 474; 707/101; 714/6

(56) References Cited

U.S. PATENT DOCUMENTS

| | | | | |
|---|---|---|---|---|
| 5,442,390 A | | 8/1995 | Hooper et al. | |
| 5,600,821 A | | 2/1997 | Falik et al. | |
| 5,768,539 A | * | 6/1998 | Metz et al. | 375/240.01 |
| 5,856,975 A | * | 1/1999 | Rostoker et al. | 345/719 |
| 5,886,995 A | * | 3/1999 | Arsenault et al. | 348/384.1 |
| 5,896,388 A | * | 4/1999 | Earnest | 370/230.1 |
| 6,002,440 A | | 12/1999 | Dalby et al. | |
| 6,006,257 A | | 12/1999 | Slezak | |
| 6,028,933 A | * | 2/2000 | Heer et al. | 713/169 |
| 6,055,242 A | * | 4/2000 | Doshi et al. | 370/458 |
| 6,075,798 A | * | 6/2000 | Lyons et al. | 370/465 |
| 6,079,566 A | * | 6/2000 | Eleftheriadis et al. | 707/101 |
| 6,081,907 A | | 6/2000 | Witty et al. | |
| 6,092,120 A | | 7/2000 | Swaminathan et al. | |
| 6,373,803 B2 | * | 4/2002 | Ando et al. | 369/59.25 |
| 6,373,856 B1 | * | 4/2002 | Higashida | 370/474 |
| 6,460,086 B1 | * | 10/2002 | Swaminathan et al. | 709/236 |

FOREIGN PATENT DOCUMENTS

| | | |
|---|---|---|
| DE | 33 27 524 A1 | 2/1985 |
| EP | 1 107 624 A2 | 6/2001 |

* cited by examiner

*Primary Examiner*—Marsha D. Banks-Harold
*Assistant Examiner*—Martin Lerner
(74) *Attorney, Agent, or Firm*—Morrison & Foerster LLP

(57) ABSTRACT

In a local storage and playback broadcast system, multiple copies of one or more processing parameters used in individual receivers for the local storage and playback are broadcast. In some embodiments each processing parameter is associated with each packet in the program so that a copy of each parameter is broadcast with each packet. In some embodiments the program is divided into segments, each segment having a header, and a copy of the parameter is broadcast in each segment header.

22 Claims, 12 Drawing Sheets

BROADCAST PROGRAM CAPTURE AND PLAYBACK ENHANCEMENT SIGNAL STRUCTURE, RECEIVER, AND METHOD

RELATED APPLICATIONS

This application is a continuation of application Ser. No. 09/630,053, now abandoned, filed Aug. 1, 2000 by Edward J. Costello, Albert W. Wegener, Thomas M. Linden, and Serge Swerdlow and entitled "Broadcast Program Capture and Playback Enhancement Signal Structure, Receiver, and Method," which is incorporated by reference. U.S. patent applications No. 09/630,036, entitled "Consumer Rating and Behavior Evaluation System" by Albert W. Wegener, Edward J. Costello, and Thomas M. Linden, and Ser. No. 09/630,037, entitled "Quality of Service Method and Apparatus for Received Programs" by Albert W. Wegener, Orlando Martinez, Edward J. Costello, Jonathan Voichick, Eric X. Wen, and Thomas M. Linden, filed concurrently with and incorporated by reference into application Ser. No. 09/630,053 are incorporated herein by reference.

BACKGROUND

1. Field of Invention

The present invention relates to information delivery services, and in particular to improving the likelihood of program reception and playback in a local storage and playback broadcast system.

2. Related Art

In many audio playback systems the selected audio programs are provided on a physical medium, such as compact disk (CD), analog tape (e.g., cassette), or removable semiconductor memory (e.g., SmartMedia® card manufactured by Toshiba Corporation, Memory Stick® by Sony Corporation, or CompactFlash® by Sandisk Corporation). The likelihood of successful program playback is high as long as the storage medium is undamaged. Alternatively, in certain types of information delivery systems audio programs are broadcast for live playback using media such as commercial amplitude and frequency modulated (AM, FM) radio or television signals. The likelihood of high quality playback using broadcast signals is proportional to the quality of signal reception. The greater the distance between transmitter and receiver, for example, the lower the likelihood of acceptable playback quality. For instance, in a typical commercial radio live (direct) broadcast system users (listeners) are likely to tune to another broadcast station when subjective playback quality becomes unacceptable.

Another communications system alternative is to broadcast audio programs to a mobile receiver for local storage (e.g., in the receiver) and subsequent playback. But program information broadcast over an unreliable (e.g., noisy) wireless broadcast medium is subject to loss of quality during transmission. What is desired in such a system are methods and measures that will improve the likelihood that the broadcast program will be properly received, reassembled, stored, and played back.

SUMMARY

In a local storage and playback broadcast system, a program (e.g., compressed audio program) is subdivided for playback into at least one segment that is a logically cohesive information group. Each program (including segments) is also divided for broadcast into fixed length data units (packets).

Processing parameters are defined to aid each receiver's storage (e.g., capture, reassembly, memory management) and playback of the program. The processing parameters are related to the program as a whole (e.g., program identifier, content compression type), each segment in the program (e.g., segment sequence number), or each packet in the program (e.g., packet sequence number).

The broadcast signal is structured in a series of frames. Each frame includes a header and at least one of the program's packets. In some embodiments, one copy of one or more of the processing parameters is included in the frame header for each program packet in the frame, thereby ensuring that each receiver has a high probability of receiving each parameter. In some embodiments one copy of one or more of the parameters is included in a segment header for each program segment.

DETAILED DESCRIPTION

Identical element numbers shown in the figures represent the same or similar features. Portions of the system are not shown so as to more clearly describe the present invention.

Embodiments are directed to an audio/video-on-demand broadcast system that delivers a user's (system subscriber's) preselected audio/video programs ("content") and system administrative features ("software," "parameters") to the user. Examples of an audio-on-demand system are provided in the patent application and patents referenced below. In addition, other broadcast communications systems fall within the scope of the disclosed embodiments. Persons skilled in communications will understand that other "programs" (video, text, graphics, etc. originating from commercial radio, television, or other sources and communication channels) are included in the embodiments described herein. U.S. patent application Ser. No. 09/454,901, filed Dec. 3, 1999 and entitled "Wireless Software and Configuration Parameter Modification for Mobile Electronic Devices" is incorporated herein by reference. U.S. Pat. Nos. 5,406,626;

5,524,051; 5,590,195; 5,751,806; 5,809,472; and 5,815,671 are also incorporated herein by reference.

Figure 1:
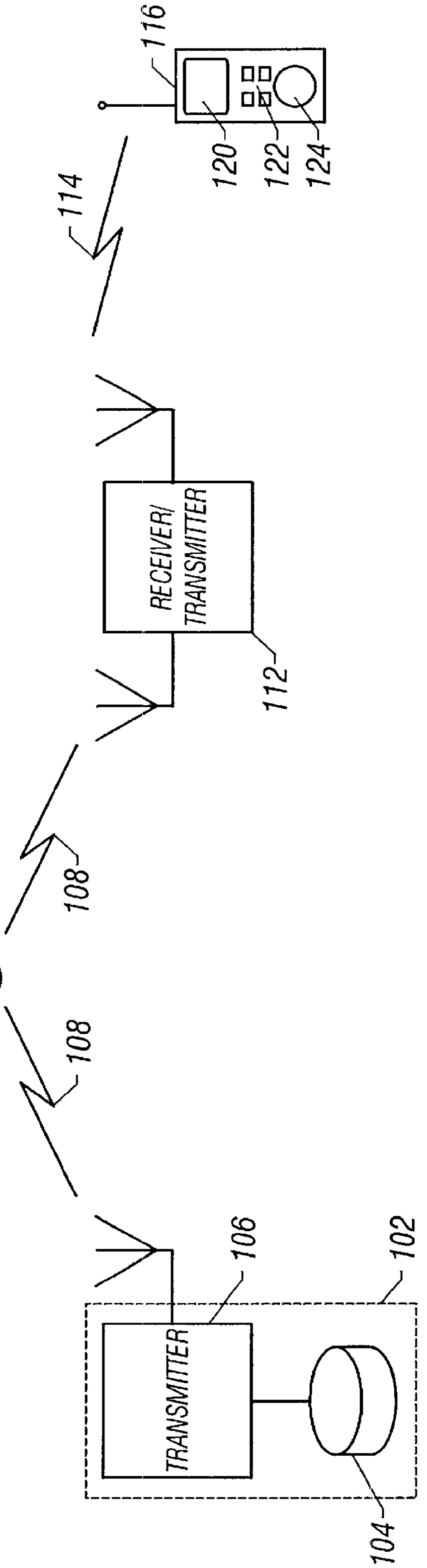
FIG. 1 is a representation of a communication system.

FIG. 1 is a representation of a wireless (radio) communication system. As shown, service center (head end) 102 includes database 104 (maintained on a conventional computer, not shown) and transmitter 106. Information stored in database 104 includes entertainment programs (e.g., news, sports, music), data (e.g., stock market data), software upgrades for the receiver, and system operating parameters (e.g., activation/deactivation codes, a program guide for the user, quality of service parameters). Information in database 104 is conventionally digitally encoded and is directed to, for example, transmitter 106 for transmission in signal 108. Specifics regarding the data structure used to transmit the programs in fixed length data units (packets) are disclosed below.

As depicted, in one embodiment radio signal 108 is relayed through satellite 110 to local receiver/transmitter 112 to allow wide geographic coverage. In some embodiments, however, the signal is transmitted from service center 102 directly to receiver/transmitter 112 (e.g., using conventional radio or television signals, land line, or optical fiber). Receiver/transmitter 112 relays the information as signal 114 to each individual user's mobile receiver 116. The transmission between receiver/transmitter 112 and receiver 116 is by amplitude modulated (AM) or frequency modulated (FM) radio, FM sideband radio, or other broadcast method. For example, in some embodiments signal 114 is transmitted as a data signal on an FM subcarrier within one or more frequency ranges in unused portions of the commercial FM broadcast spectrum (88.0–108.0 megahertz (MHz)). In other embodiments service center 102 transmits directly to receiver 116.

Receiver 116 is typically a mobile (portable) unit and includes a conventional visual display 120 (e.g., liquid crystal (LCD) or thin-film transistor (TFT)), conventional keypad 122, and conventional output audio transducer 124 (e.g., an audio speaker or headphone). Display 120 presents information or descriptions of selected programs to the user. Transducer 124 outputs programs and other information to the user as audio (playback). The user makes program selections by pressing keys on keypad 122. In the illustrative audio-on-demand system, for example, a menu of available programs (program guide) is displayed to the user on display 120 and the user selects programs for output using keypad 122. The selected programs are captured from signal 114, stored in the receiver, and are output using transducer 124 at the user's discretion. The receiver may be a hand-held portable device, or may be incorporated into a larger system such as an automobile radio.

Figure 2:
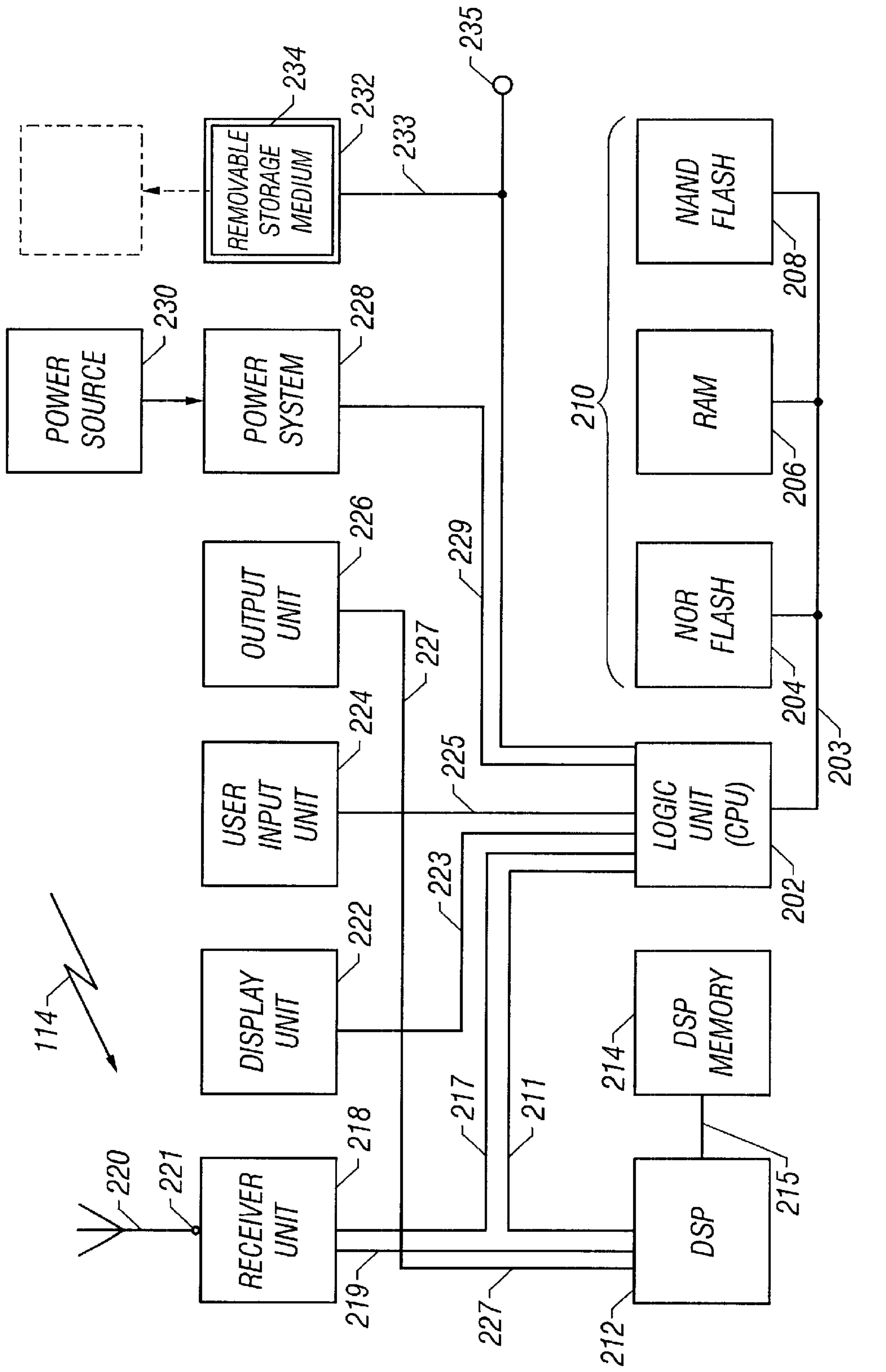
FIG. 2 is a block representation of a receiver.

FIG. 2 is a block representation of several interconnected components of receiver 116. Electrically conductive interconnections between components are described as a "line" in the description that follows, although persons skilled in the art will understand that the interconnections may have one or more physical coupling paths. Some interconnections, such as those to the power supply system, and other components are omitted to more clearly show the features of several embodiments. The components and their configuration are illustrative and many acceptable variations exist.

Logic unit 202 functions as a central processing unit (CPU) and includes a conventional microprocessor/microcontroller (e.g., Motorola MC68307). Logic unit 202 is electrically coupled via line 203 to conventional NOR flash memory 204 (e.g., AM29LV400BB-120E manufactured by Advanced Micro Devices, Inc.), conventional random access memory 206, and conventional NAND; flash memory 208 (e.g., TH58V128FT manufactured by Toshiba, Inc.). Memories 204, 206, and 208 together comprise content storage memory 210. In one embodiment memory 210 has sufficient capacity to store approximately eight hours (for normal playback) of received compressed audio programs.

Details regarding the memory and information storage are described in U.S. patent application Ser. No. 09/454,901, cited above. Quality of service parameters discussed below may be considered options as described in that application. In some embodiments the quality of service parameters are included in the broadcast program guide that is used to present the menu of available programs to the user. Quality of service parameters may be varied for each program. Therefore in some embodiments each program's quality of service parameters are broadcast within the same data structure that describes the program's name and availability (program guide). Quality of service parameters can also be separately broadcast from the program guide.

Logic unit 202 is electrically coupled via line 211 to conventional digital signal processor (DSP) 212 (e.g., Texas Instruments TMS 320 C52). In some embodiments DSP 212 contains conventional Viterbi and Reed-Solomon error correction decoders. Conventional DSP memory 214 is also electrically coupled via line 215 to DSP 212.

Logic unit 202 is coupled via line 217 to receiver unit 218. DSP 212 is coupled via line 219 to receiver unit 218, and antenna 220 is coupled to input terminal 221 of the receiver unit. In one embodiment receiver unit 218 is a conventional tunable frequency modulated (FM) receiver capable of tuning to and receiving information from a signal broadcast as an FM subcarrier in the commercial FM frequency band. Tuning is controlled by logic unit 202 that accesses a list stored in memory of FM frequencies, described below. Signals, such as signal 114, received by receiver unit 218 are directed to DSP 212 for decoding and further processing as described below. Logic unit 202 acts together with receiver unit 218, DSP 212, the associated memories, and other components to capture, reassemble, decode, use, store, evaluate, delete from storage, and output as described below the program information from the broadcast signal.

Conventional visual display unit 222 is electrically coupled via line 223 to logic unit 202. Display unit 222 functions to output visual information (e.g., program guide, play time remaining) to the user, and includes display 120 as shown in FIG. 1.

User input unit 224 is coupled to logic unit 202 via line 225 to logic unit 202. Input (user interface) unit 224 includes, for example, keypad 122 (FIG. 1) and may also include switches or other conventional mechanisms for receiving user input. In some embodiments input unit 224 includes a conventional speech recognition system that allows the user to direct spoken commands to logic unit 202. Users activate one or more switches or buttons to play back stored audio programs, thus accessing stored content at their convenience.

Output unit 226 is coupled via line 227 to digital signal processor 212. Output unit 226 includes a conventional audio output speaker, and in some embodiments a headphone output terminal, for outputting audio (e.g., speech, music) programs to the user. In some embodiments the output unit includes a conventional speech synthesizer for outputting human speech.

Power system 228 is coupled to logic unit 202 via line 229. Power system 228 provides power to the various receiver components from power source 230. Power system 228 is conventionally adapted to receive electric power from several direct current (DC) power sources such as a battery pack, a conventional alternating current (AC) adapter plugged into a wall socket, or an automobile cigarette lighter socket that receives power from either the automobile's battery or regulated DC from the alternator. Power system 228 distinguishes these power sources by monitoring the input voltage from power source 230. In one embodiment a voltage below 6.2 V is presumed to indicate a battery pack, voltage between 6.2 V and 11.8 V to indicate an AC adapter, between 11.8 V and 12.5 V to indicate an automobile cigarette lighter with the engine off, and above 12.5 V to indicate an automobile cigarette lighter with the engine running.

Recording unit 232 is coupled via line 233 to logic unit 202 and allows data from the memories to be copied to and recorded on removable data storage medium 234 that is removable from the recording unit, as illustrated by the dashed lines. This removable storage medium is referred to as a "back channel card" below. In one embodiment medium 234 is a SMARTMEDIA® card manufactured by Toshiba, Inc. Other embodiments may use other removable storage media such as CompactFlash® memory, multimedia cards, or secure digital (SD) cards. In some embodiments output terminal 235 is placed on line 233 to allow direct output of data rather than by recording on medium 234.

Figure 3:
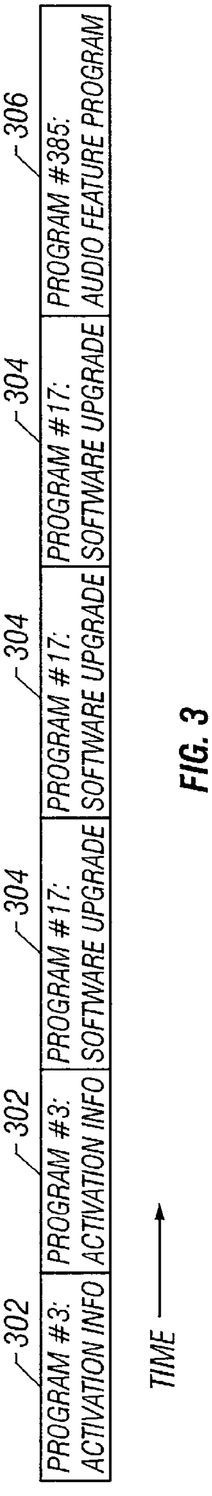
FIG. 3 is an illustration of the time sequence of program transmissions.

In the illustrative system, each separate portion of information (content, software, parameters) is termed a "program" and is assigned a unique program identifier (e.g., number) at service center 102. Some programs are transmitted once during a particular time interval. Other programs are transmitted several times. Thus FIG. 3 is an illustration of the time sequence of program transmissions. All program identifiers (e.g., program number 3) are illustrative and can be modified from time-to-time by the audio-on-demand service provider. For instance, activation information 302 is assigned program number 3 and is transmitted twice. The receiver software upgrade 304 is assigned program number 17 and is transmitted three times. Audio feature program 306 is assigned program number 385 and is transmitted once. In practice the number of transmissions per program varies, and the programs are interleaved for broadcast.

The receiver identifies the program by using the assigned program identifier. The receiver compares the program identifier in the signal to identifiers in a capture list stored in the memory. The capture list contains the identifiers for the programs that the user wants to hear, as well as identifiers for programs used for receiver administration (e.g., software updates). The desired programs are then captured, stored, and made available for playback, usually in the same order each day. The capture list may be modified by users (customers) using keypad 122 (FIG. 1) on user input unit 224 (FIG. 2). During playback of one program, the user may skip to the next program in sequence by pressing a "next" button on input unit 224. Programs are normally deleted from memory after playback, but the user may choose to store a particular program in a designated "stored programs" area of memory 208 by pressing a "store" button. When the "store" button is pushed, the logic unit copies the program from the playback area to the stored programs area of the memory.

Figure 4:
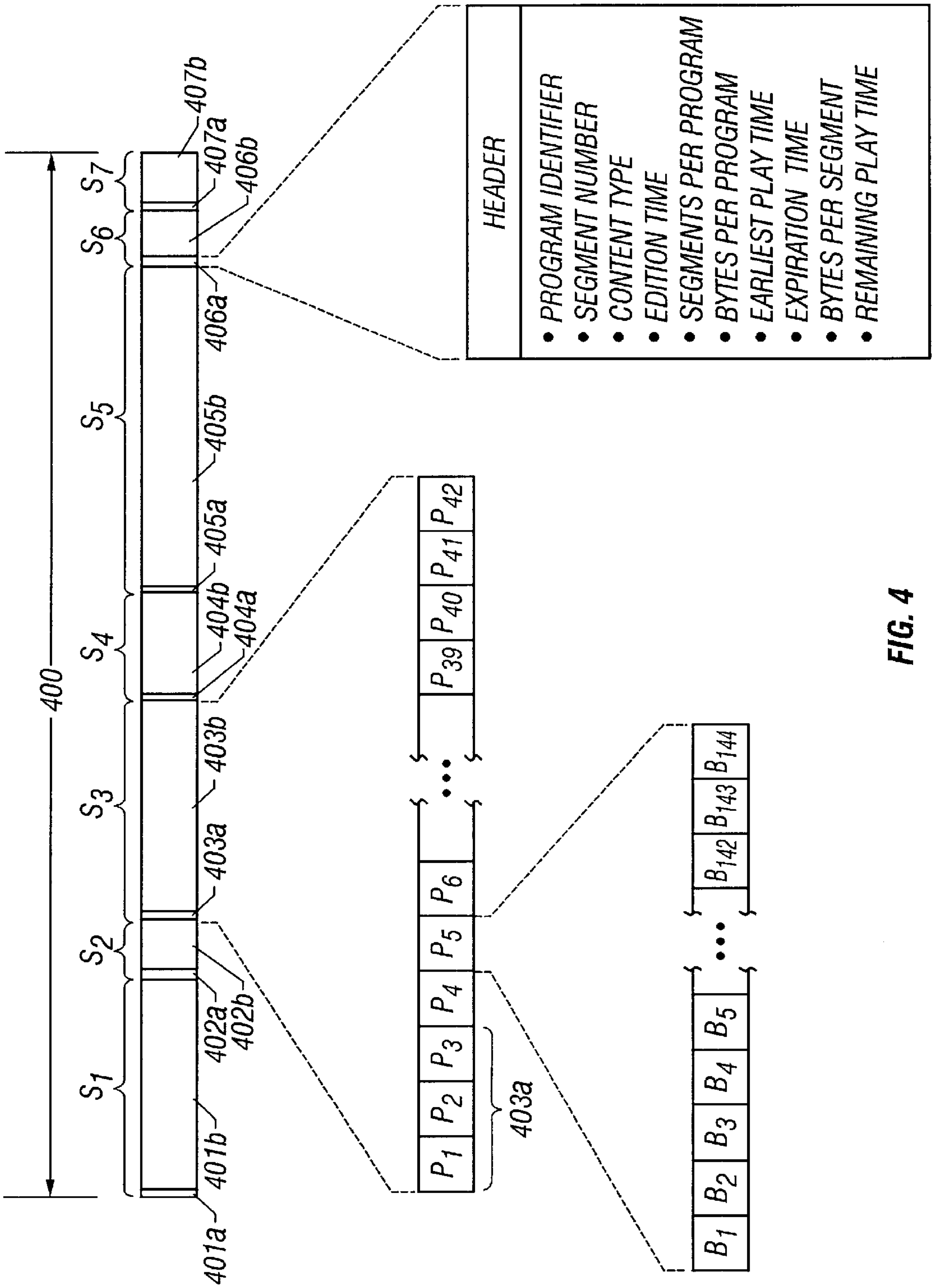
FIG. 4 illustrates an audio program structure composed of segments, packets, and blocks.

Each program is broadcast in a program signal (e.g., 108, 114 in FIGS. 1 and 2). The digitized program is divided into fixed length data units ("packets") which themselves are composed of blocks of compressed data. The packets within each program are grouped into at least one program "segment." FIG. 4 illustrates an audio program structure composed of segments, packets, and blocks. This illustrative program is approximately eight minutes and fifty-eight seconds (8:58) in duration. As shown, program 400 is composed of seven segments $S_1$–$S_7$, each segment being a different length and so made up of different numbers of packets. Each segment $S_1$–$S_7$ includes both a segment header and segment data. For example, segment $S_1$ includes segment header **401*a* and segment data 401*b*. Similarly, segments $S_2$–$S_7$ include segment headers 402*a*–407*a* and segment data 402*b*–407*b*, respectively. Each segment header 401*a*–407*a* includes information, described in detail below, associated with the particular segment. Each segment data 401*b*–407*b*** includes the segment content that is, for example, decompressed and then output to the user as audio.

Each segment within a program represents a particular logically coherent portion, such as a news story, song, or other comprehensive information grouping. If the program is a news program, for example, each segment is a separate news story. Alternatively, if the program is a traffic report, each segment covers traffic conditions in a particular area. In some embodiments the user may skip over undesired segments during program playback by pressing a "scan forward" button on his or her receiver keypad. Programs and segments may also contain software data or parameters for the receiver's internal use.

Segment $S_3$ is shown expanded to illustrate that it is composed of forty-two packets $P_1$–$P_{42}$. Each packet $P_1$–$P_{42}$ is made of 144 6-Byte compressed data blocks so that each packet is 864 Bytes long. Packet $P_5$ is shown expanded to illustrate that $P_5$ is composed of blocks $B_1$–$B_{144}$. The segment $S_3$ segment header **403*a* includes, for example, packets $P_1$–$P_3$. The remaining packets $P_4$–$P_{42}$ are associated with the segment $S_3$ segment data 403*b***. The other segments $S_1$, $S_2$, and $S_4$–$S_7$ are composed of similar packets.

For this example the programs are compressed before broadcast (e.g., using the AMBE® code, developed by Digital Voice Systems, Inc.) and decompressed by the receiver before output to provide an effective playback rate of 300 Bytes per second (B/sec). There are 6 Bytes per compressed data block, and 50 compressed data blocks per second are transmitted. During playback the audio is decompressed to a rate of 16 kB/sec (16-bit samples played at a rate of 8000 samples/sec). This decompression represents an approximately 53-fold expansion and shows that the use of compressed speech and audio increases the number of programs that can be offered on the broadcast signal to the user. In some embodiments the broadcast data transmission rate is between 2 and 4 times the program playback rate, although the transmission and playback rates are independent.

Each data block when decompressed yields approximately 20 milliseconds (msec) of audio program. Accordingly, each packet yields approximately 2.88 seconds (sec) of playable audio (864 Bytes/Packet*Block/6 Bytes*20 msec/Block). Since segment $S_3$ has 42 packets, the duration of $S_3$ is approximately two minutes (120.96 sec). For program 402, composed of segments $S_1$–$S_7$, the segment durations are as shown in TABLE I for a total duration of 538 seconds (8:58). In many situations, however, the length of the segment data will not correspond to an exact multiple of the packet output duration, and so the last portion of the final packet in a segment (e.g., packet $P_{42}$) will not contain useful information.

TABLE I

| Segment | No. Packets | Duration (approx.) |
|---|---|---|
| 1 | 42 | 121 sec. |
| 2 | 11 | 32 sec. |
| 3 | 42 | 121 sec. |
| 4 | 16 | 46 sec. |
| 5 | 63 | 181 sec. |
| 6 | 6 | 17 sec. |
| 7 | 7 | 20 sec. |

Figure 5:
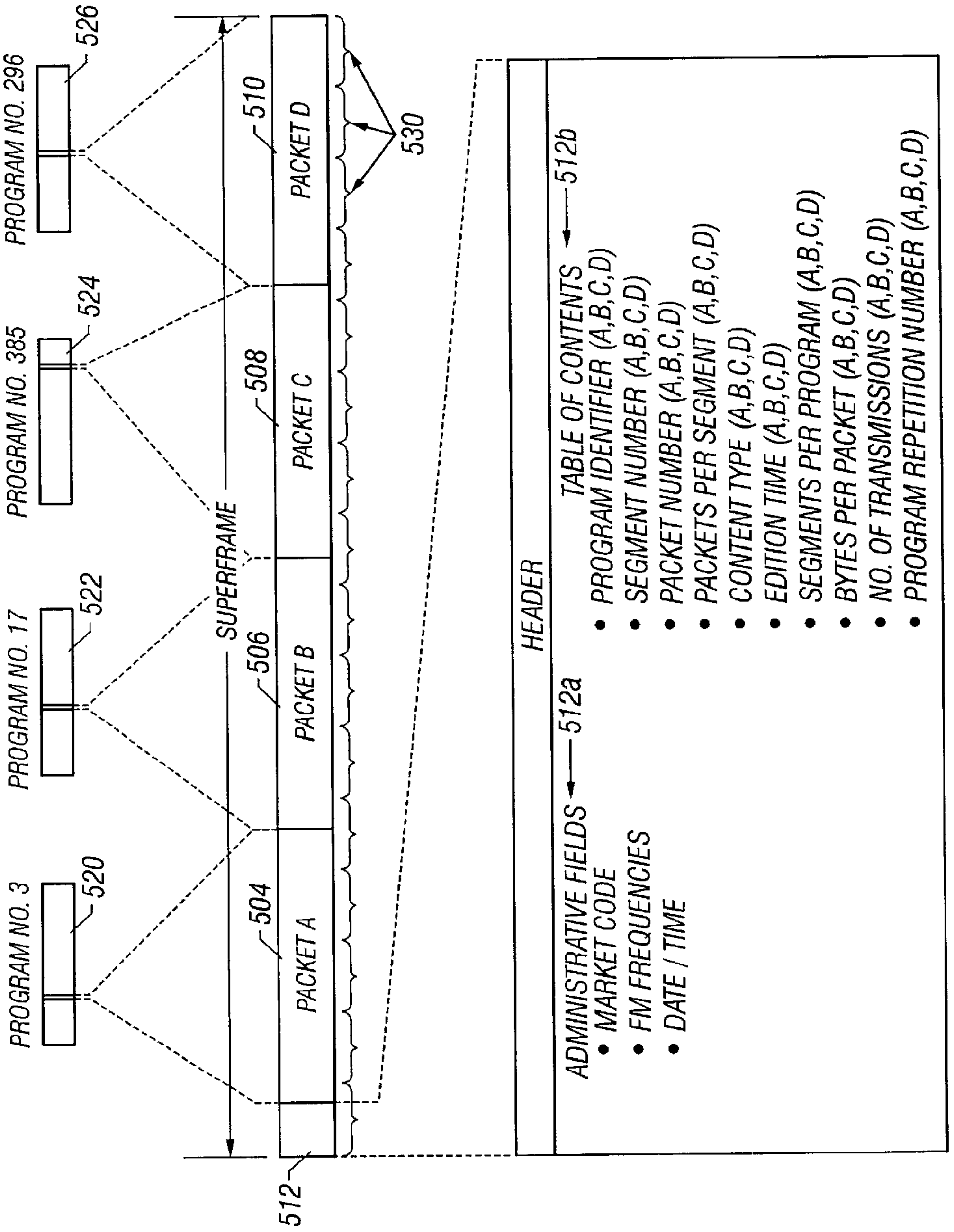
FIG. 5 is an illustration of the data structure for a signal portion transmitted to the receiver.

FIG. 5 is an illustration of the data structure for the signal broadcast to the receiver. In some embodiments, the broadcast signal uses coding typical to many wireless systems and includes a convolutional inner code (e.g., based on the Viterbi algorithm), two interleavers, a Reed-Solomon outer code, and synchronization words (sync words) that aid initial signal acquisition. The error-correcting codes and sync words provide the receiver with the capability to detect and correct signal data transmission errors.

Program-related information is grouped into a "superframe" 502 that includes four packets 504, 506, 508, and 510 and a combined 112-Byte header 512 that includes a table of contents. One superframe embodiment contains 3568 data Bytes (112+(4*864)). In one embodiment each superframe is broadcast at a rate of about 1025 Bytes/second, and so the time required for each superframe transmission is approximately 3.48 sec. In one embodiment, one unique sync word is placed at the start of each superframe, and fourteen additional sync words are equally spaced within the superframe.

Superframe header 512 includes several administrative fields 512*a* that contain information required to manage the program delivery service. These fields include information such as the market code, the list of FM frequencies that carry the program signal, and the current date and time. The market code identifies the geographic region (market) in which the receiver is located. The list of FM frequencies identifies one or more frequencies in which the same audio-on-demand data is broadcast. When the receiver falls to reliably receive a broadcast signal on one frequency, the receiver references the list of FM frequencies to identify the next frequency to which the receiver should tune to reaquire a data signal. The date and time information synchronizes the receiver clock (not shown) with the broadcast system time.

Superframe header 512 also includes a table of contents 512*b* associated with the packets that follow in the superframe. Information about the parameters included in the table of contents is described in detail below.

As shown, each of the four packets in the superframe originate from four unique programs 520, 522, 524, and 526. Thus if the superframe cannot be recovered without error (e.g., transmission anomaly causes superframe damage) the burden of unusable or missing packets is shared among more than one program. Alternatively, the superframe may contain packets from fewer than four unique programs.

In one embodiment the superframe is divided into 16 conventional Reed-Solomon error correction blocks 530. Each Reed-Solomon block contains 223 data Bytes (for the superframe, 16*223=3568), to which the Reed-Solomon coding adds 32 error correction bytes (total of 255 Bytes per Reed-Solomon block yielding a superframe size of 4080 Bytes prior to convolutional coding and insertion of sync words). Thus each packet includes portions of 4 or 5 Reed-Solomon blocks. The 32 error correction bytes allow DSP 212, which contains the Reed-Solomon decoder, to correct up to 16 Byte errors within the 255-Byte Reed-Solomon block. In addition, the Reed-Solomon decoder can detect when more than 16 Byte errors have occurred within one Reed-Solomon block, and so can detect a failure of the error-correction system.

Processing Parameters

During operation, the audio/video-on-demand receiver should accomplish three general tasks to ultimately output received programs to the user. First, the receiver should process received packets in order to reassemble the broadcast program. Second, when the receiver determines that it is capturing a new program, it should allocate memory for the captured program's storage. Third, the receiver should have information available that controls segment output to the user. Thus program reassembly and storage, along with segment playback, are key receiver tasks, and several parameters are provided to assist these tasks. Logic unit 202 uses these software parameters during receiver operation.

Certain program-specific (unique to each program), segment-specific (unique to each segment), and packet-specific (unique to each packet) parameters are used. Some of these parameters are required and others are optional.

Program-specific parameters include the program identifier, the number of segments per program, the number of Bytes per program, the program edition time, the earliest program play time, the program expiration time, the number of repeat transmissions, and the transmission repetition number.

The program identifier, as described above, identifies the specific program being broadcast.

The number of segments per program allows the receiver to anticipate memory space required to store the program, and in particular the size of the required offset index described below.

Similarly, the number of bytes per program (program size) allows the receiver to allocate sufficient memory for program storage, or to determine that insufficient free memory exists.

The program edition time parameter is a value that uniquely identifies the particular program edition, such as a particular news program that is periodically updated throughout the day. For embodiments that broadcast two or more editions of a program with the same program identifier, the receiver uses the edition time parameter to determine if a stored version (earlier edition) of the program should be replaced with a currently received version (subsequent edition).

The earliest program play time parameter identifies the earliest allowable playback time. For instance, a particular audio program may be contractually limited from playback using the audio-on-demand system until the program is first locally broadcast on a commercial "live" broadcast system.

The program expiration time parameter sets a time after which the stored program is unavailable for playback. For instance, the expiration time parameter identifies a time at which the program is no longer expected to be useful, or implements a contractual obligation under which the program may not be stored in excess of a particular duration (e.g., 30 days).

The number of repeat transmissions is the total number of repeat transmissions for this particular program. The transmission repetition number identifies the position of the particular program transmission in the series of total program transmissions. That is, for a program that is transmitted three times, the repetition number is either 1, 2, or 3, and the total transmissions is 3. The receiver can therefore anticipate the total number of transmissions for a particular program.

The total repeat transmissions and repetition number information allows the receiver to determine, for example, that if a particular program has not satisfied a quality of service threshold, as described below, after the last repeat transmission the receiver can free memory holding the stored substandard program for a new program capture.

Segment-specific parameters include the segment number, the packets per segment, the Bytes per segment, the segment content type, and the remaining play time.

The segment number parameter identifies the segment sequence in the program.

The packets per segment parameter allows the receiver to allocate sufficient memory space for the segment.

The Bytes per segment parameter allows the receiver to stop segment playback at a particular location (e.g., completion of the usable content portion of the segment) since, as noted above, the last packet in the segment may not be completely filled with compressed blocks.

The segment content type parameter identifies the compression method used for the particular segment. Some programs, for instance, may include both speech and music content, each compressed using a different method.

The remaining play time parameter is a value identifying the remaining program playback duration. In a program containing three one-minute playback duration segments, for example, the remaining play time parameters for segments 1, 2, and 3 are 3:00, 2:00, and 1:00, respectively. In some embodiments the remaining play time parameter represents the starting value of a count-down clock that is displayed to the user on the receiver's visual display (e.g., 120, FIG. 1). The remaining play time parameter is adjusted/derived to account for missing segments.

In some embodiments the number of Bytes per segment parameter is derived from the number of Bytes per packet parameter for a given segment. And in some embodiments, the remaining play time parameter is derived from the segment size and content type parameters.

In addition to program- and segment-specific parameters, other parameters are associated with packets. One packet-specific parameter identifies the packet's sequence number within a given segment. Another packet-specific parameter identifies the number of Bytes per packet.

The program, segment, and packet parameters listed above may be classified into two logical groups. One group is related to program reassembly and need not be stored along with the program for playback. Reassembly parameters should, however, be quickly available to the receiver to allow proper program capture. This program reassembly group includes the program identifier, the segment number, the packet sequence number, and the packets per segment. Parameters in the second group are stored with the reassembled program and are related to program storage and/or playback. This storage and playback group includes edition time, segments per program, Bytes per program, earliest play time, expiration time, content type, Bytes per segment, remaining play time, and Bytes per packet. As discussed below, the parameters may be broadcast to the receiver as part of the superframe header or the segment header.

Some parameters are required for proper receiver operation. For example, each transmitted packet is identified by four unique elements: the program number to which the packet belongs, the segment number to which the packet belongs, the packet sequence number within the segment, and the program edition time (if applicable). Thus in some embodiments the receiver must receive these parameters.

In some program broadcast circumstances, however, one or more of the program, segment, or packet parameters may be missing. For example, a superframe including these parameters may be damaged by transmission anomaly. Or, the receiver may power up just after a particular program broadcast has started, and will miss parameters broadcast at the beginning of the program. Thus the more frequently these parameters are broadcast, the better the chance that at least part of the broadcast program will be properly captured, reassembled, and stored. Furthermore, when the proper parameters are received, full memory space will be allocated for the non-received program part for later capture, reassembly, and storage during broadcast of a second program copy. Therefore the most important parameters are identified and then broadcast more often than other parameters of lesser importance.

Table II is a summary showing the required and optional parameters for program capture, reassembly, and storage, and for segment playback. Critical parameters, as shown in TABLE II, are required in some embodiments to ensure that program content is delivered to the user.

TABLE II

| PARAMETER | REQ'D FOR CAPTURE AND REASSEMBLY | REQ'D FOR SEGMENT PLAYBACK | CRITICAL FOR PROPER OPERATION |
|---|---|---|---|
| Program ID | Yes | | Yes |
| Seg. No. | yes | | Yes |
| Pkt. No. | Yes | | Yes |
| Pkts./Seg. | Yes | | Yes |
| Content Type | | Yes | Yes |
| Edition Time | Yes | | Yes |
| Segs./Pgm. | Yes | | Yes |
| Bytes/Pkt. | | Yes | Yes |
| Bytes/Pgm. | Yes | | Yes |
| Earliest Play Time | | | No |
| Expiration Time | | | No |
| Bytes/Seg. | | Yes | No |
| Remaining Play Time | | | No |
| No. of Trans's. | Yes | No | Yes |
| Pgm. Repetition No. | Yes | No | Yes |

To increase the probability that the receiver receives the necessary parameters, some of the parameters described above are broadcast in the superframe header (e.g., 512, FIG. 5), some in the segment header (e.g., 403*a*, FIG. 4), and some in both the superframe and segment headers. As shown in TABLE III below, in one embodiment the parameters placed in the superframe header are the program identifier, the segment number, the packet number, the number of packets per segment, the content type, the edition time, the segments per program, the Bytes per packet and the Bytes per program. Thus each one of these parameters is sent once for each packet in the program. The parameters in the superframe header are formatted in fields within table of contents 512*b* (FIG. 5). The letters A, B, C, and D shown next to each parameter name illustrate that the table of contents contains one parameter entry for each packet A, B, C, and D shown. The parameters placed in the segment header include several that are in the superframe table of contents, plus the earliest play time, the expiration time, the Bytes per segment, and the remaining play time. Thus each of these parameters is broadcast once for each program segment. These parameters are entered into conventionally formatted fields in the segment header.

Table III summarizes the broadcast placement of parameters in one embodiment. Parameters grouped under A are used during program reassembly. Parameters grouped under B are used during playback and are stored with the program in memory. Positioning the parameters within the table of contents in the superframe header or within the segment header is based on the desired frequency of transmission for each parameter. Other embodiments may have particular parameters assigned in various other arrangements between the superframe and segment headers.

TABLE III

| | FIELD | TYPE INFO | SEGMENT HEADER | SUPERFRAME TOC | SENT WITH EACH PKT. | SENT WITH EACH SEG. |
|---|---|---|---|---|---|---|
| A | Pgm. ID | Pgm. | X | X | X | X |
| | Seg. No. | Seg. | X | X | X | X |
| | Pkt. No; | Pkt. | | X | X | |
| | Pkts./Seg. | Seg. | | X | X | |
| B | Content Type | Seg. | X | X | X | X |
| | Ed. Time | Pgm. | X | X | X | X |
| | Segs./Pgm. | Pgm. | X | X | X | X |
| | Bytes/Pkt. | Pkt. | | X | X | |
| | Bytes/Pgm. | Pgm. | X | X | X | X |
| | Earliest Play Time | Pgm. | X | | | X |
| | Expiration Time | Pgm. | X | | | X |
| | Bytes/Seg. | Seg. | X | | | X |
| | Remaining Play Time | Seg. | X | | | X |
| | No. of Trans's | Pgm. | | X | X | |
| | Pgm. Repetition No. | Pgm. | | X | X | |

Other receiver operating parameters not discussed above may be coded as data contained in one or more packets. These parameters are accessed by coded instructions (e.g., software, firmware) executed by the microprocessor in the logic unit. For example, coded parameters may be updates to existing quality of service parameters, discussed below.

Figure 6:
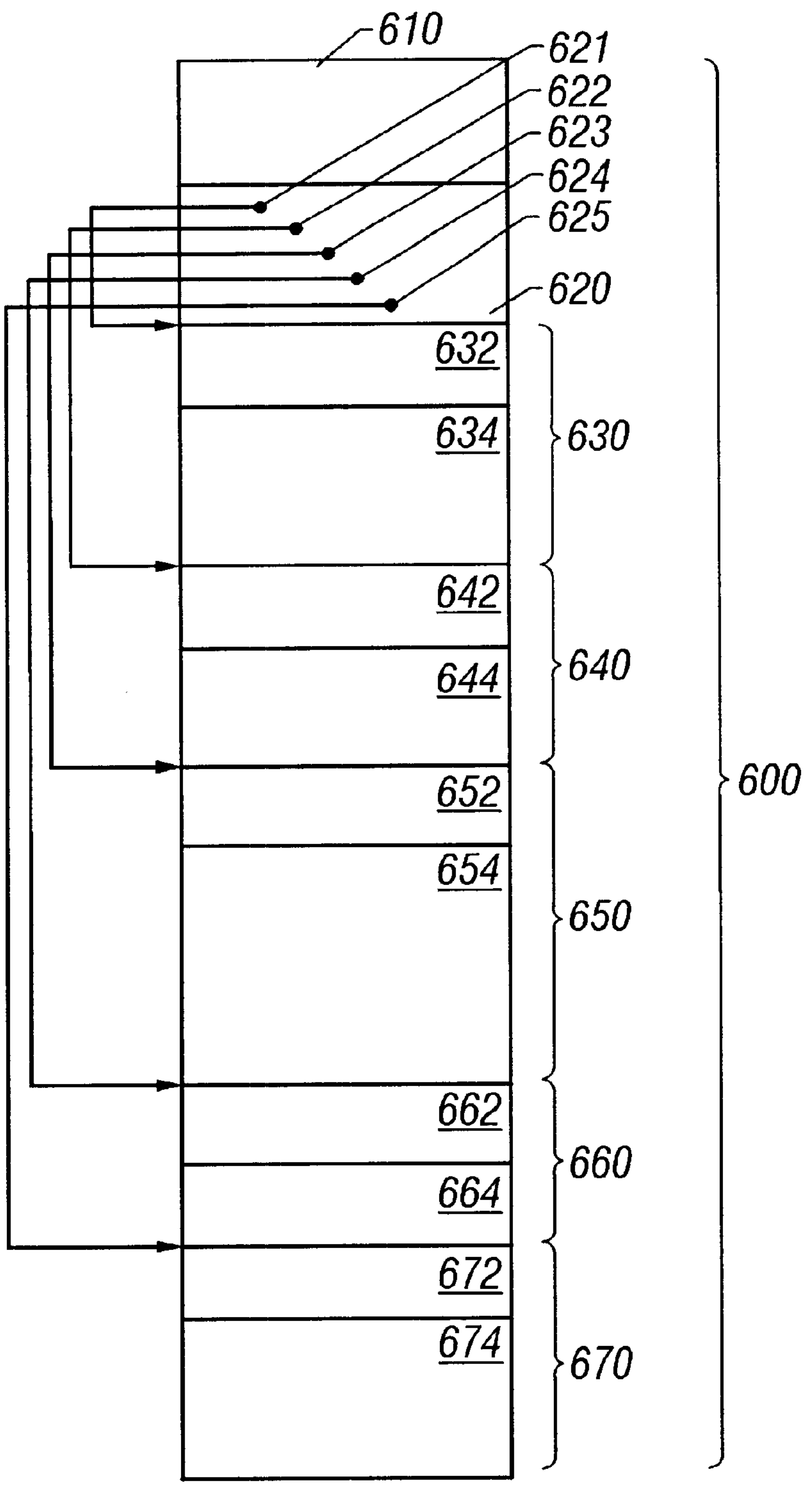
FIG. 6 is a memory map.

FIG. 6 is a memory map showing one embodiment of data associated with a particular program stored in the receiver's memory and available for playback. The memory allocation shown is illustrative; persons familiar with memory management will understand that many storage configurations are satisfactory. As depicted, stored information 600 is all of the stored information necessary for outputting a five-segment program to the user. Included in information 600 is program information 610, offset index 620, and segment information 630, 640, 650, 660, and 670 associated with program segments 1, 2, 3, 4, and 5, respectively. Program information 610 includes program-related parameters, such as the program identifier, edition time, segments per byte, Bytes per program, earliest play time, and expiration time. Segment information 630, associated with program segment 1, includes segment information 632 and segment data 634. Segment information 632 includes the segment number, content type, Bytes per segment, and remaining play time parameters. Segment data 634 includes the data to be output to the user as audio. Segment information 642, 652, 662, and 672, and segment data 644, 654, 664, and 674, each associated with segments 2, 3, 4, and 5, respectively, contain similar information and data as described for segment 1. Offset index 620 includes offsets that point to the unique beginning storage location for each segment information. Thus, offsets 621, 622, 623, 624, and 625 point to the beginning storage location for segments 630, 640, 650, 660, and 670, respectively. These offsets may be used, for example, when the user elects to skip to a segment subsequent to the one currently in playback.

Quality of Service

Some embodiments include a packet quality evaluation based on conventional digital data transmission error checking. Upon receipt, the number of Reed-Solomon failures per packet is determined and a quality code is assigned to the packet (e.g., 0–5 with 0 best and 5 worst). In addition, a particular packet may be missing and no quality code can be assigned. Within the receiver the digital signal processor passes the packet data and the number of Reed-Solomon failures to the logic unit. Packets with acceptable quality codes are stored for use, and those with less than acceptable quality codes are either stored or discarded. Thus for multiple transmissions of the same packet, the packet with the best acceptable quality code is kept by the receiver. In other embodiments a simple pass/fail evaluation is used, and packets with quality codes greater than zero (0) are discarded. Logic unit 202 (FIG. 2) uses these software quality of service features during receiver operation.

Figure 7:
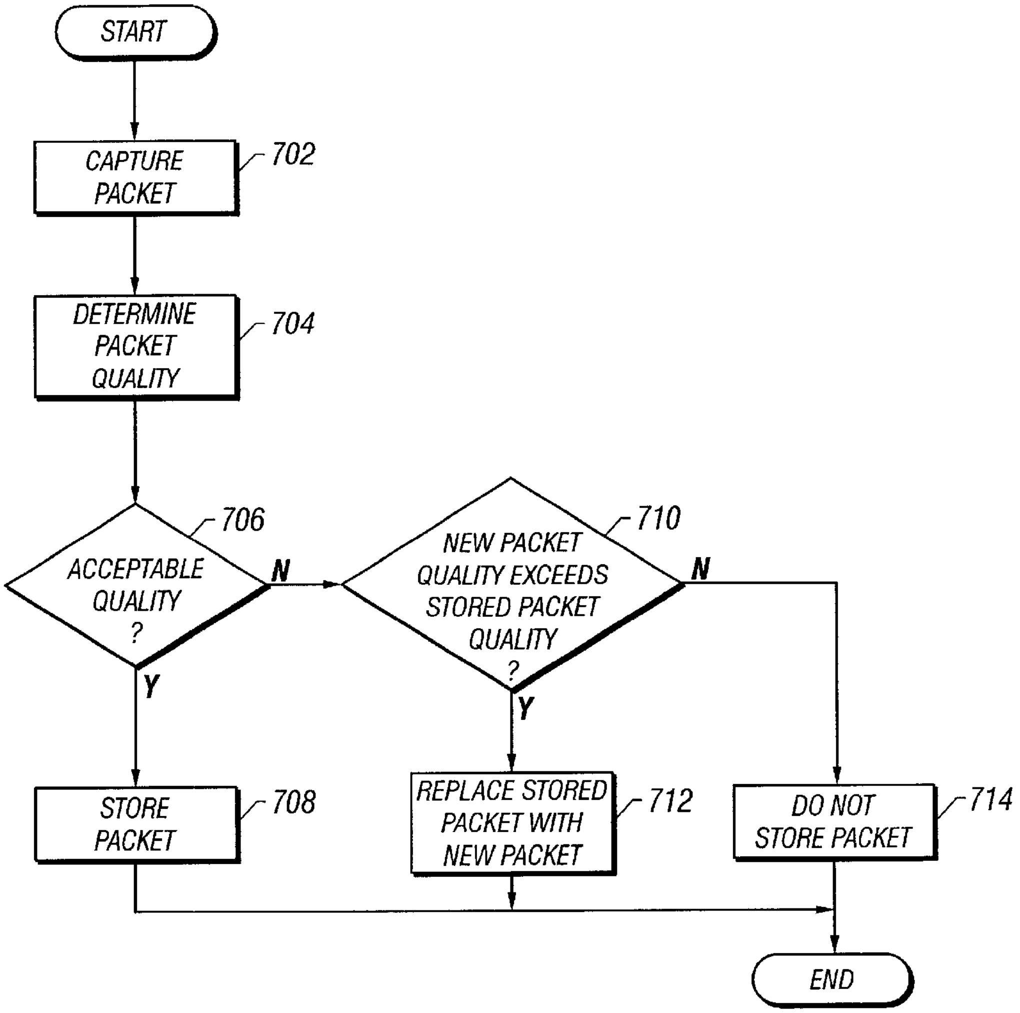
FIG. 7 is a flow diagram showing an embodiment of packet quality evaluation.

FIG. 7 is a flow diagram showing packet quality evaluation as performed by the receiver's logic unit 202. The process is illustrative, and many acceptable variations exist. In 702 the packet is captured. In 704 the number of Reed-Solomon failures is determined and a quality code is assigned to the received packet data. In 706 the received packet's quality code is evaluated against a predetermined standard (e.g., only packets with code 0 are acceptable). In 708 acceptable quality packets are stored for use. If the received packet is not of acceptable quality in 706, the received packet's quality code is compared in 710 with the quality code of the same packet received during an earlier transmission (if any). If the newly received packet's quality is higher, in 712 the newly received packet replaces the previously stored packet. If not, the received packet is discarded in 714.

Figure 8:
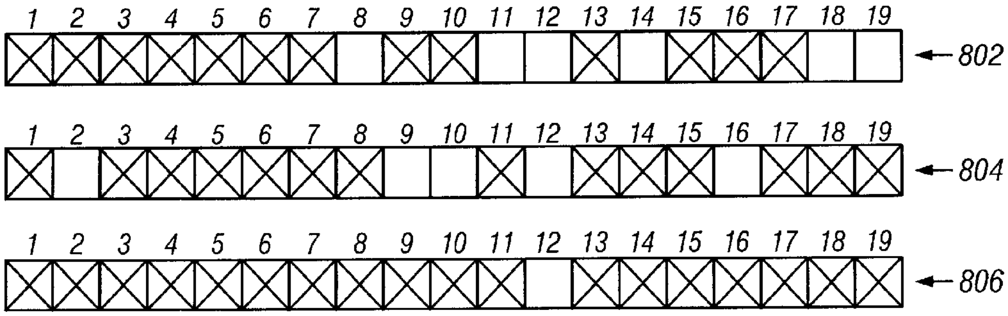
FIG. 8 illustrates a segment reassembly process.

FIG. 8 is an illustration of the segment reassembly process for a 19-packet segment (54.7 secs of program output). The segment is transmitted twice in this example, once as segment 802 during the program's first transmission, and once as segment 804 during the program's second transmission. Packets 1–19 for each of segments 802 and 804 have been transmitted in superframes, although some superframes have been corrupted during transmission so that some segment packets are unusable (unacceptable quality or missing). Acceptable packets (e.g., based on quality evaluation discussed above or simple pass/fail) are shown (for purposes of the FIG. 8 drawing) with an "X". For segment 802, packets 8, 11, 12, 14, 18, and 19 are unusable. Similarly, for segment 804, packets 2, 9, 10, 12, and 16 are unusable. By combining usable packets from segments 802 and 804, segment 806 is constructed with 18 of 19 packets being usable. Packet 12 from both transmissions is unusable, but the best unusable packet 12 is stored when a packet quality evaluation process is used as described above.

Two characteristics regarding the packets in a segment are (i) the total number of usable packets within the segment, and (ii) the number of consecutive unusable packets. In segment 802, for example, 13 of 19 packets are usable (68.4 percent). In addition, the largest number of consecutive unusable packets is 2: packets 11 and 12, and packets 18 and 19. Similarly, 14 of 19 packets in segment 804 are usable (73.7 percent) and the largest number of consecutive unusable packets is also 2: packets 9 and 10. For the cumulative segment 806, 18 of 19 packets are usable (94.7 percent) and the largest number of consecutive unusable packets is 1: packet 12.

Compressed program data from an unusable packet is unavailable for proper playback to the user, and program playback quality suffers. The duration of the unplayable program (burst) is proportional to the number of unusable packets. If the unusable packets are consecutive, playback intelligibility suffers in direct proportion to the number of consecutive missing packets. If the first five packets are missing from a segment, for example, the first 14.4 seconds (5*2.88) of the segment are unavailable for playback. But playback quality is also affected by the distribution of unusable packets throughout the segment. If segment 804 is output to the user, the user misses times 2.88–5.76 secs, 23.04–28.80 secs, 34.56–37.44 secs, and 43.2–46.08 secs of the program. Segment playback continuity is seriously affected in both the consecutive and distributed unusable packet situations, and segment playback continuity is an important consideration in assessing a segment's subjective output quality.

In a similar manner, consecutive or distributed missing segments in an entire program affect program quality. In addition, in some programs the subjective playback quality heavily depends on receiving either the first or last segment. First segments may contain an overview of the entire program that if omitted playback information prevents the user from understanding the organization of the information that follows. Last segments may contain the conclusions or a summary of preceding arguments that if omitted will leave the user hanging or confused.

Quality of service (QoS) embodiments quantify the minimum acceptable level of program quality by requiring that a minimum percentage of each segment be present, and require that there be no more than a specified number of consecutive unusable packets. Quality of service embodiments also quantify the minimum number of acceptable segments in a program, and require that certain segments be present in particular programs. Quality of service parameters are specified on a program-by-program basis.

TABLE IV illustrates several possible QoS requirements for various programs (e.g., syndicated radio and other programs). The requirements shown are illustrative.

TABLE IV

| | Segment QoS | | Program QoS | |
|---|---|---|---|---|
| Program Type | Min % packets | Max Burst | Min % Segs | First/Last Seg |
| Caller-Driven Talk Shows | 85% | 3 | 50% | F/L |
| Topic-Driven Talk Shows | 85% | 2 | 95% | F/L |
| Short Form News | 95% | 2 | 85% | F/- |
| Long Form News | 85% | 2 | 95% | F/L |
| One-Segment | 95% | 2 | 100% | F/L |
| Bulletins | 100% | 0 | 100% | F/L |
| Data | 100% | 0 | 100% | F/L |

Caller-driven radio shows, such as ones currently hosted by Laura Schlessinger Ph.D. ("Dr. Laura"), Dean Edell, MD, and Tom and Ray Magliozzi ("Car Talk"), typically include separate caller interviews that are formatted as segments within the programs. There is little, if any, cross-reference among interviews and so each interview stands on its own. If some interviews (i.e., segments) are missing, these programs can be presented and will still appear coherent to average users. Accordingly, 50 percent has been set as the Program QoS minimum percent segments requirement. In addition, since each interview is relatively long (e.g., an average of four minutes), a moderate portion (e.g., 15 percent) of the packets in each segment and up to 3 consecutive segments (8.6 secs) can be missing while maintaining acceptable program quality.

Topic-driven talk shows typically discuss a single topic during the program. Therefore, topic-driven shows can accept only 5 percent missing segments and a burst length of only 2 packets (5.8 secs).

Short format news shows (e.g., half-hourly programs originating from the American Broadcasting Company [ABC] or National Public Radio [NPR]) typically have approximately a five-minute duration. Each story/segment must be of high quality and therefore 95 percent of the packets are required. In addition, 85 percent of the segments are required for acceptable quality. Current headlines are typically broadcast at the start of short format news programs and consequently the first segment must be present. This program type rarely contains a closing summary and so the last segment may be missing.

Long format news shows (e.g., NPR's "All Things Considered") typically contain longer stories/segments than short format shows. Long format show QoS parameters are similar to those for short format shows, although a larger number of missing packets is acceptable because the segments tend to be longer. Longer segments allow users to better establish context even in the presence of more missing audio. On the other hand, long format news shows often have interrelated stories/segments and therefore a higher percentage of segments must be present in long format news shows than in short format shows. Long format shows also may contain conclusions or wrap-up stories so the last segment should be present.

One-segment programs are typically short, single subject presentations (e.g., "Earth and Sky" produced by Byrd and Block Communications, Inc.). These programs should present high output quality on their single segment.

Bulletins (e.g., short traffic or news bulletins), which are often less than one minute in duration, should be complete. In addition, in some embodiments data such as software updates for the receiver, updated quality of service parameters, new program guides being presented to the user, new system service activation and deactivation codes, and critical consumer information (e.g., stock quotes) must be received error-free to be usable.

The ability to specify the desired QoS parameters on a program-by-program basis allows the service provider to define "acceptable" for the users' receivers. The subjective quality of "acceptable" may be tailored on a program-by-program basis based on user feedback. If users perceive a particular program's output to be unacceptable, the provider can increase one or more QoS parameter thresholds until users are satisfied. Alternatively, QoS parameters set too high may be lowered with a consequent decrease in the number of repeat transmissions required for a particular program. That is, if acceptable QoS is achieved with N-1 transmissions instead of N transmissions, the Nth transmission may be omitted and the free bandwidth may be used to transmit additional programs, either to increase QoS of other transmitted programs, or to add new programs to the service.

Figure 9:
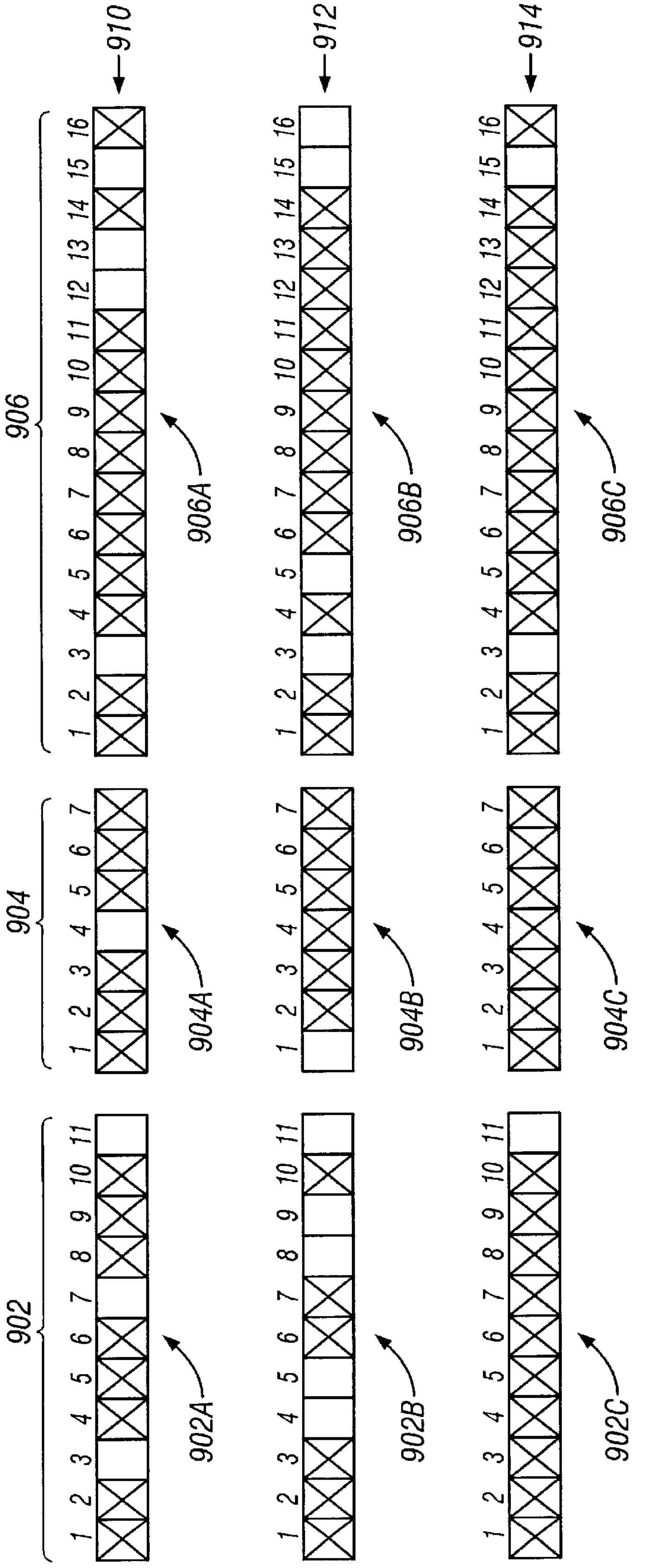
FIG. 9 is an illustration of an embodiment of received program reassembly and evaluation based on quality of service parameters.

FIG. 9 illustrates an embodiment of received program reassembly and evaluation based on QoS parameters as carried out, for example, by the receiver's logic unit as software instructions stored in the memory and executed by the microprocessor. As shown, a program having three segments 902, 904, and 906 is transmitted twice. The first transmission is shown as line 910, the second transmission as line 912, and the cumulative results of the two transmissions as line 914 (see the discussion accompanying FIGS. 6 and 8 above). Thus as shown, segment 902A is the first, 904A the second, and 906A the third of the three segments in the program's first transmission. Likewise segments 902B, 904B, and 906B are for the program's second transmission, and segments 902C, 904C, and 906C are for the cumulative results. Packets are transmitted in super-frames with error correction as described herein.

During the first transmission, all but packets 3, 7, and 11 were usable for segment 902A; all but packet 4 for segment 904A; and all but packets 3, 12, 13, and 15 for segment 906A. During the second transmission, all but packets 4, 5, 8, 9, and 11 were usable for segment 902B; all but packet 1 for segment 904B; and all but segments 3, 5, 15, and 16 for segment 906B. Thus for the cumulative result, only packet 11 is unusable in segment 902C, all packets are usable in segment 904C, and only packets 3 and 15 are unusable in segment 906C.

In this example, the QoS parameters are as follows: Minimum packets per segment (QoS1): 85 percent; Maximum allowable consecutive unusable packets (QoS2): 1; Minimum segments required per program (QoS3): 50 percent; First and last segments required (QoS4): yes/yes. The following QoS evaluation is illustrative.

After the first transmission, first segment 902 (segment 902A) failed because only 8 of 11 packets (73%) were received and QoS1 requires 85 percent. Segment 902 passed QoS2. At this point the program fails QoS3 and QoS4 because zero of 3 (0%) segments are usable, and because the first segment (segment 902) is unusable. Second segment 904 (segment 904A) passed QoS1 and QoS2 because 6 of 7 packets (86%) were usable and only 1 consecutive packet is unusable. The program continues to fail QoS3 because only 1 of 3 segments (33%) is usable, and to fail QoS4 because the first segment is unusable. Third segment 906 (segment 906A) fails QoS1 because only 12 of 16 packets (75%) are usable, and fails QoS2 because two consecutive packets (12 and 13) are unusable. Thus after the first transmission the program fails QoS3 and QoS4 because only one of three segments is usable, and because both the first and last segments are unusable.

After the second transmission the first, second, and third segments are combined with the those from the first transmission and the cumulative results are evaluated. As shown, first segment 902 (segment 902C) passes QoS1 because 10 of 11 packets (91%) are usable. The first segment also continues to pass QoS2. Now, 2 of 3 segments (67%) are usable (the second segment from the first transmission and the first segment from the cumulative results) and the program passes QoS3. But the third (last) segment is still unusable, and so the program still fails QoS4. Second segment 904 (segment 904C) continues to pass QoS1 and QoS2, but the program still fails QoS4. Finally, third segment 906 (segment 906C) passes QoS1 because 14 of 16 packets (88%) are available, and passes QoS2 because no more than one consecutive packet is missing. Accordingly, 3 of 3 segments (100%) are now usable and both the first and last segments are usable, so that the program passes QoS3 and QoS4. The program is then stored in the receiver's memory for output to the user.

Figures 10, 10A:
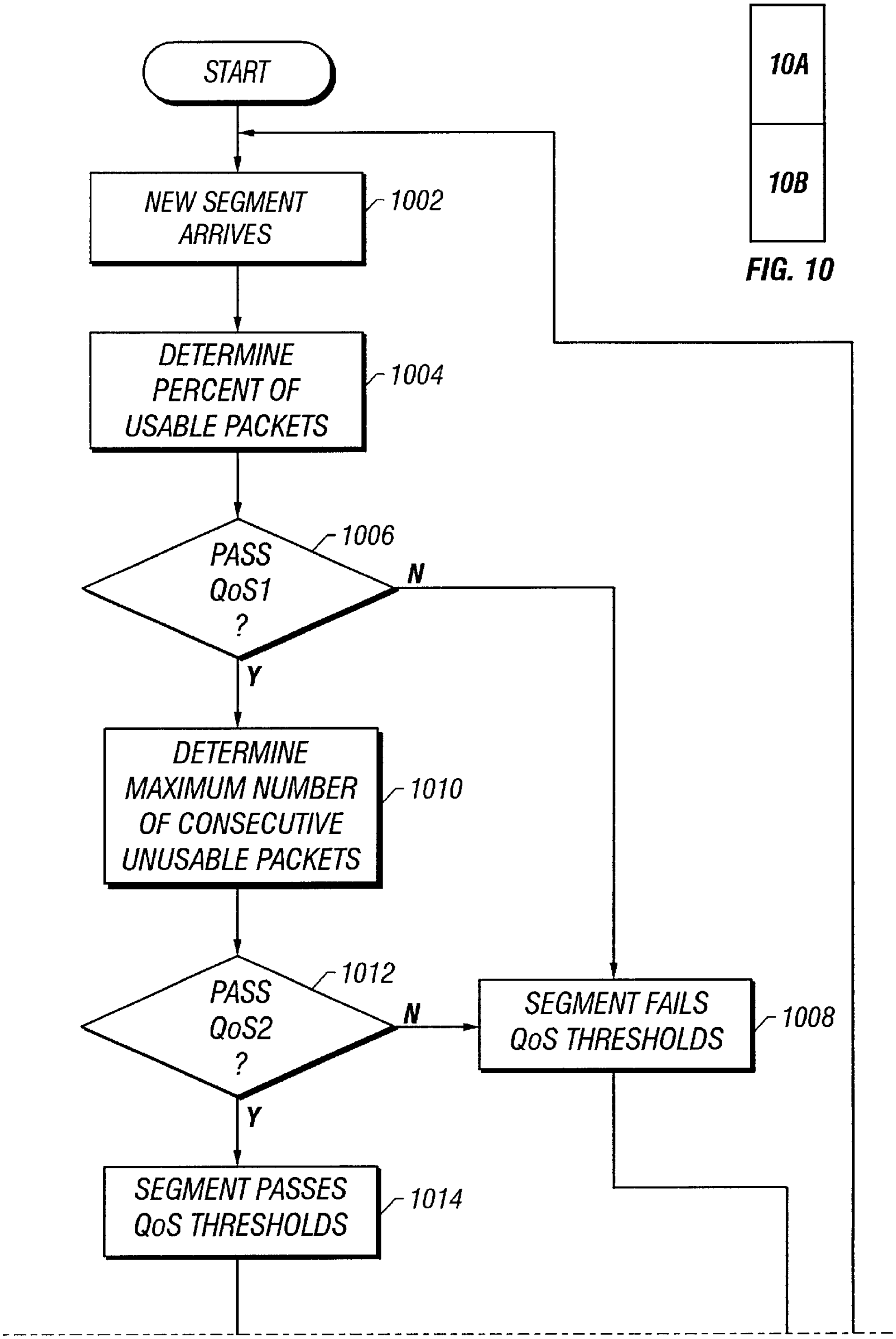
FIG. 10, composed of FIGS. 10A and 10B, is a flow diagram illustrating a quality of service evaluation embodiment.
Figure 10B:
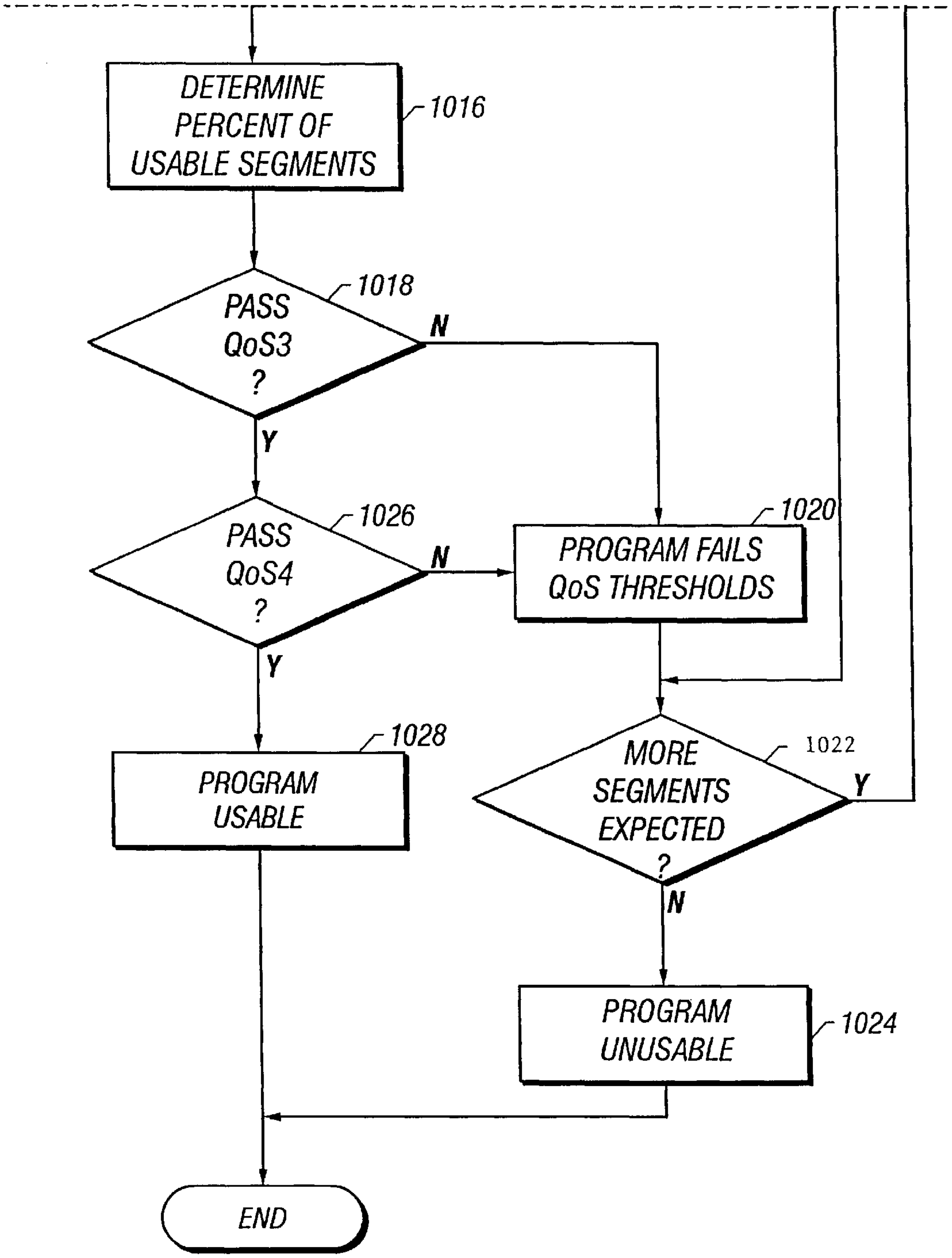

FIG. 10 (FIGS. 10A and 10B combined) is a flow diagram illustrating an embodiment of a quality of service evaluation as carried out, for example, by the receiver's logic unit as software instructions stored in the memory and executed by the microprocessor. The evaluation is executed for each new segment that arrives at the receiver. In the embodiment shown, evaluation is carried out before data decompression, since decompression is part of the output playback operation. In 1002 the new segment is captured and stored in memory (e.g., a designated "repair" area of memory 208 in FIG. 2), and the percentage of usable packets in the segment is determined in 1004. The first segment quality of service test requires that the percentage of usable packets in the segment be above a predetermined level (QoS1). In 1006 the percentage determined in 1004 is evaluated against the QoS1 threshold. If the segment fails QoS1 the method moves to 1008. If the segment passes QoS1 the maximum number of consecutive unusable packets is determined in 1010. The second segment quality of service test requires that the number of consecutive unusable packets in the segment be less than a predetermined threshold (QoS2). If in 1012 the segment fails QoS2 the evaluation moves to 1008, but if the segment passes QoS2 the evaluation moves to 1014, indicating that the segment has passed both quality of service tests. The program quality is then evaluated.

In 1016 the percent of usable segments (stored in memory) is determined. The first program quality of service test requires that the percentage of usable segments in the program be above a predetermined level (QoS3). If the program to which the new segment belongs fails QoS3 the evaluation moves to 1020. At this point in 1022 it is determined if more segments are expected to be received. If so, the evaluation returns to 1002 and awaits another segment for this program. If no additional segments are anticipated, the program is determined to be unusable in 1024. If the new segment passes QoS3 in 1018, it is then determined if the first and/or last program segments are usable. The second program quality of service test requires that the first and/or last segments in a program be usable if so specified (QoS4). If the first and/or last segments are not usable as required, the program fails QoS4 in 1026 and the evaluation moves to 1020. If the program passes both QoS3 and QoS4 the program is determined to be usable in 1028.

Figure 11:
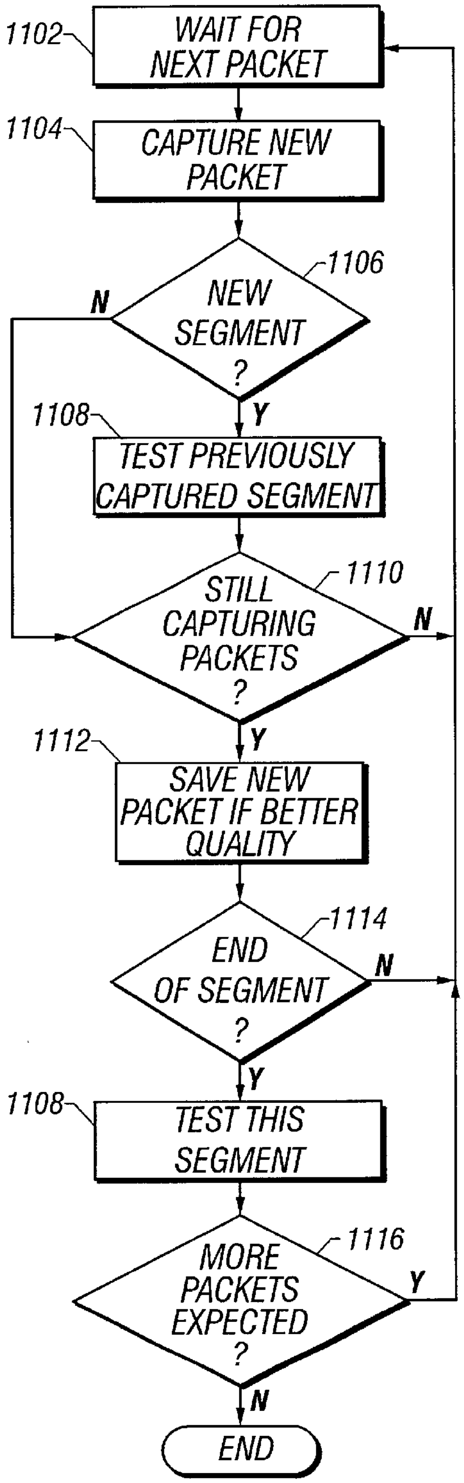
FIG. 11 is a flow diagram illustrating a second embodiment of a quality of service evaluation.

FIG. 11 is a flow diagram of a second embodiment of a quality of service evaluation as carried out, for example, by the receiver's logic unit as software instructions stored in the memory and executed by the microprocessor. As described above, packets may be continually arriving at the receiver. When the last packet in a segment is captured, the segment is then stored. If multiple transmissions of the same program are made, an earlier version of a particular newly arrived segment will have been previously stored. In 1102 the method waits for the next packet to arrive at the receiver. In

1104 the new packet is captured and in 1106 it is determined if the packet is associated with a new segment (i.e., the first packet associated with a following segment). If not, the segment captured during a previous transmission of the program (if any) is tested in 1108 as described in relation to FIG. 11 below and the evaluation moves to 1110. In 1110 the evaluation determines if packets are still being captured for the program associated with this new packet, as directed by 1108. If in 1106 the new packet is part of a new segment, the evaluation moves directly to 1110.

If in 1110 packet capture for this program has stopped, the evaluation returns to 1102. Otherwise, the evaluation moves to 1112 and saves the new packet if it is better quality than the corresponding packet saved in the previously stored version of the segment. In 1114 the evaluation determines if the packet has completed the segment and, if not, it returns to 1102. If the new segment is complete it is evaluated using the 1108 method. When evaluation is complete, in 1116 it determines if more packets are expected and if so, returns to 1102. Otherwise this embodiment ends.

Figure 12:
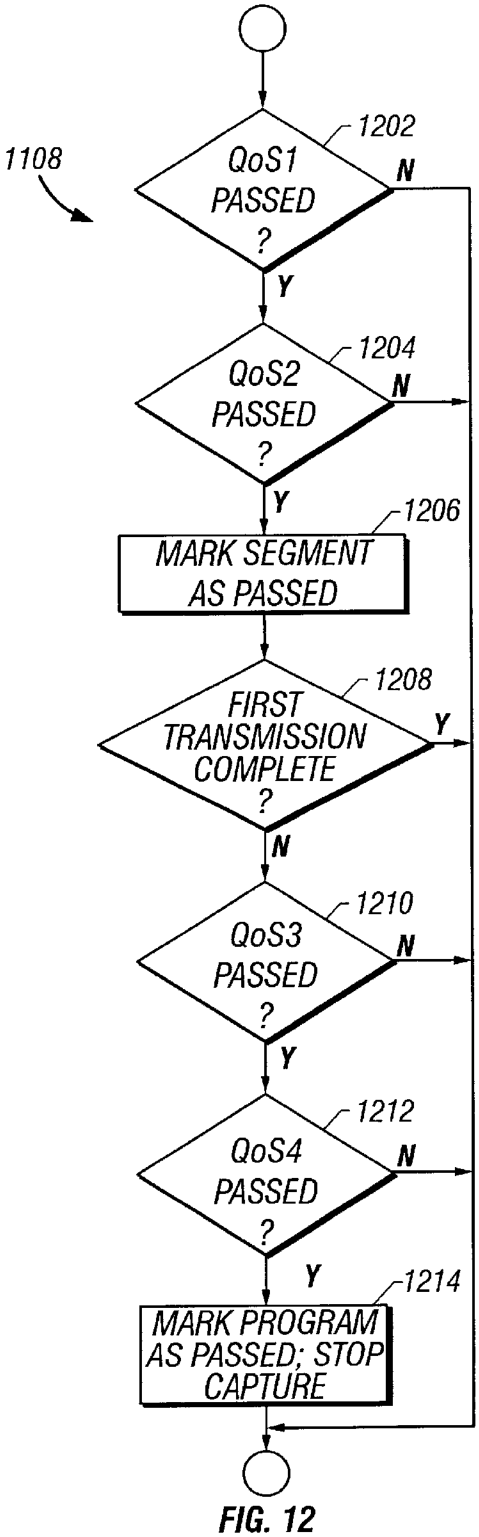
FIG. 12 is a flow diagram of a segment evaluation embodiment.

FIG. 12 is a flow diagram of the segment evaluation method referred to in 1108 of FIG. 11. Quality of service tests QoS1, QoS2, QoS3, and QoS4 are as described in relation to FIG. 10. The segment is evaluated against QoS1 and QoS2 as shown in 1202 and 1204, respectively. If the segment passes both tests it is marked in 1206 as passed. Otherwise 1108 ends. If in 1208 the segment is part of the first transmission of the program 1008 also ends. But if 1208 determines that the last packet of the last segment of the first transmission has been received, or if the segment is from a subsequent program transmission, the program is evaluated against QoS3 and QoS4 as shown in 1210 and 1212, respectively. Programs successfully passing QoS3 and QoS4 are marked in 1214 as passing and capture of the particular program ends. In this embodiment capture ends when acceptable QoS standards have been met so as to make the program available for playback. Persons skilled in the art will appreciate, however, that in other embodiments the programs may be restricted from output until all transmission have been received, thus potentially providing a quality of service in excess of the acceptable QoS standards.

Note that coding the software or firmware to carry out the processes of FIGS. 7, 10, 11, and 12 would be routine in light of this disclosure, using a programming language compatible with the microprocessor in logic unit 202. Similarly, designing an application-specific circuit using a standard hardware design language would also be routine.

These embodiments offer several advantages. First, the service provider may specify one or more unique quality of service standards for each program delivered. Second, subjective concepts of quality are translated into objective measurements of both the entire program and portions of the program. Third, when a particular program is received more than once, the receiver may use the quality of service parameters during program reassembly to determine when the program and its portions have satisfied quality of service parameters. Fourth, the quality of service parameters may be made more stringent at the service provider's discretion. Fifth, the quality of service parameters may be made less stringent, enabling the service provider to decrease the number of repeat transmissions for selected programs and consequently allowing the total number of programs, or the quality of other programs, to be increased.

Persons skilled in communications will realize that the invention is not limited to the various embodiments described. Quality of service parameters may be applied to various metrics that quantify the subjective program delivery quality. Such metrics include the clustering of damaged packets (e.g., density of unusable or missing packets is too high in a given program, or within a predetermined number of consecutive packets), the clustering of damaged segments (e.g., density of unusable or missing segments is too high in a given program, or within a predetermined number of program segments), specifying specific packets that must be received, specifying specific segments (other than first or last) that must be received, and transmitting the quality of service parameters with the program itself or within the superframe table of contents.

Consumer Rating and Behavior Evaluation System

It is desirable for the local storage and playback broadcast system service provider to monitor signal and program quality reception at the receivers and also to monitor the users' content consumption patterns.

Programs broadcast to the user's portable receiver are broadcast on the "forward channel." Information taken from the user's receiver and directed back to the service provider is routed via the "back channel." Information to be transferred from the receiver to the service provider includes "back channel events" that are grouped into five major categories. Each back channel event is stored in a back channel-log file that in some embodiments includes a date/time stamp that is used to determine the time of the event or the duration between events. The back channel log is stored in memory 208 (FIG. 2). In some embodiments the back channel events are transferred from memory 208 to removable data storage medium 234 ("back channel card") which functions as a vehicle for information transfer back to the service provider. In other embodiments the back channel events are transferred to the service center via a conventional communications link coupled to terminal 235.

Capture events describe the quality of segments and programs when they are stored by logic unit 202 in memory 210. Capture events show how well each segment and each program are received. The combined capture events from many receivers provide the service provider with an indication about how well all system receivers are receiving broadcast programs. Capture events include QoS events, which are based on QoS determinations described above, and also include summary segment and program statistics events, such as the number of programs that passed or failed in a given time period (e.g., per hour or per month). Summary segment and program statistics measure the distribution and total of individual segment and program quality events. In some embodiments the summary segment and program statistics events are derived from QoS events. Saving the statistics rather than the raw events at the receiver saves storage space in memory 208. In some instances, information required to record capture events is taken from signals occurring on line 203, in memory 210, or on line 225.

Storage management events occur as logic unit 202 reassembles, stores, copies, and deletes programs in memory 210. Storage management events are recorded whenever a program is saved, copied, or deleted. A "save" event is recorded when, as described above, audio programs are saved in memory 210 when first captured for playback. A "copy" event is recorded when the user elects to save a particular program by copying the program into the "saved programs" memory area. A "delete" event occurs when logic unit 202 deletes a previously stored program from memory 210 in order to make room for storing a new program. Thus storage management events indicate to the service provider the programs that have been captured by the receivers, how long the captured programs were available for playback, and if users saved the programs in the "saved programs"

memory area. In some instances, information required to record storage management events is also taken from signals occurring along line 203, within memory 210, or on line 225.

Playback events include user inputs (e.g., button presses and switch changes), actual user playback program selections, and changes to the receiver's program capture list. Each user input made on input unit 224, for example pushing the "next" or "scan forward" buttons as described above, is recorded. Playback events indicate to the service provider the programs that were selected for playback, the ones actually played(including edition number), the times they were played, and receiver options that were changed. Such receiver options include the number of programs stored in the capture list, or a selection between immediate or deferred playback of bulletins. In some instances, information regarding playback events may be taken from signals occurring along line 225.

Control events occur whenever the receiver is tuned to a new FM frequency on the FM frequency list, described above, or when power source 230 changes. If signal 114 does not contain the desired subcarrier signal, DSP 212 reports this discrepancy to logic unit 202 that, in turn, directs via line 217 receiver unit 218 to tune to the next frequency in the FM frequency list and logs a "retune" control event. Logic unit 202 also records a "change of receiver power source" control event when power system 228 detects a change in power source. The control events allow the service provider to see how often retuning was required (an indirect indication of signal quality) and the likelihood of users using particular power sources (an indirect indication of where the users are using their receivers). In some instances control event data is taken from lines 217 and 229.

Signal quality events include statistics, stored for example in DSP memory 214, regarding the errors that the digital signal processor encounters as it receives programs. Signal quality events provide the service provider with an indication of how well the broadcast encoded signal is being received. Channel error rate is an indication of overall channel (e.g., FM broadcast frequency) quality, so that the higher the error rate, the higher the likelihood of capture errors. Channel errors are measured by comparing the received symbols (a symbol represents two bits) prior to Viterbi decoding to the re-encoded output bits of the Viterbi decoder. The synchronization error rate is a measurement of synchronization word errors. DSP 212 identifies the number of bits within each synchronization word that have been damaged in transmission because the words are placed at regular intervals and the bit pattern is known. The synchronization error provides an estimate of the channel error rate. The sync bits represent only about two percent of the bits in a superframe, whereas the channel error rate includes the errors with respect to the remaining ninety-eight percent of the superframe bits. The Reed-Solomon error rate is the number of Reed-Solomon errors per Reed-Solomon data block (e.g., 255 Bytes as described above). The Reed-Solomon failure rate is the number of Reed-Solomon failures (e.g., more than 16 Byte errors in a Reed-Solomon block) per superframe.

In addition to the five categories of events listed above, "meta events" are also defined. Meta events include the insertion of the removable data storage medium into the recorder (detected by a unique file stored on the medium). When the card is inserted, logic unit 202 recognizes the back channel card, information identifying the specific receiver is recorded on the card, and back channel data is automatically copied to the card from memory 210. Thus the user's previously gathered demographic information is correlated with recorded back channel events. This correlation provides valuable advertising information regarding the listening habits of specific users. Meta events also include recording of any transfer of the receiver to a new geographic area. Such transfer is detected using the market code in fields 512*a* of FIG. 5. Meta events further include enabling or disabling monitoring of certain back channel events. For example, if the receiver's power switch is turned off, signal quality, storage management, and capture events no longer need to be monitored. Thus meta events from multiple receivers indicate to the service provider how the receivers have moved among two or more service areas.

In one embodiment, the service provider mails SMARTMEDIA® cards via the United States Postal Service or similar delivery service to a select group of users (back channel participants). To establish valid back channel statistics, at least two percent of the system users should be randomly chosen to be back channel participants.

Figure 13:
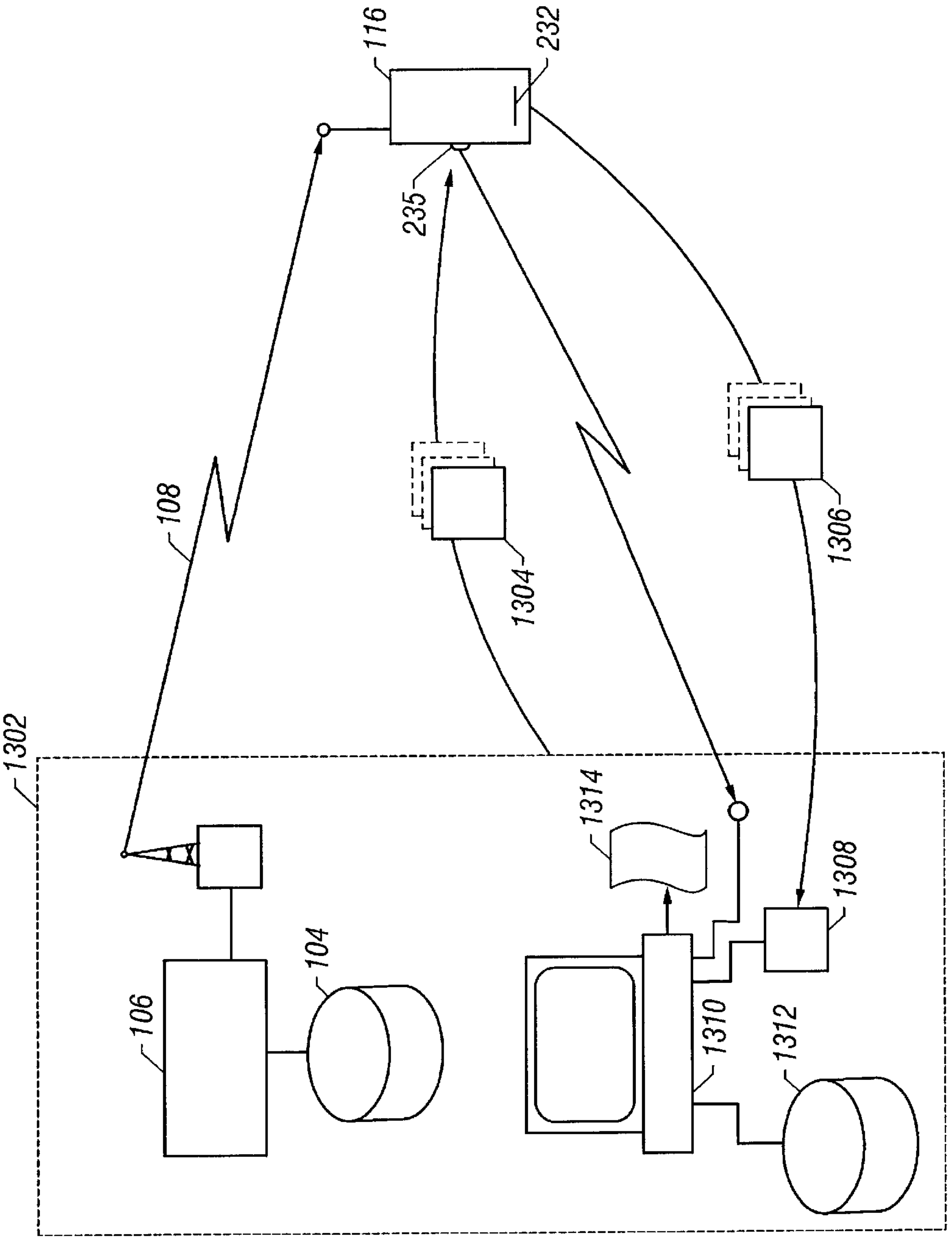
FIG. 13 is a diagram illustrating the use of a removable storage medium for back channel operation.

FIG. 13 is a diagrammatic view illustrating an embodiment of the consumer rating and evaluation system. As described above, program content and other parameters are accessed from database 104 and the accessed information is transmitted using transmitter 106 via signal 108 to audio/video-on-demand receiver 116. Receiver 116 captures the broadcast information on the receiver's capture list and stores the captured information in memory. In addition, service provider 1302 delivers one or more media cards 1304 to each unique user who is a back channel participant. When each participant receives the back channel card, he or she inserts the card into recorder 232 in the receiver. The receiver detects that the card is a back channel card by identifying the existence of a unique file or identifier stored on card 1304 and consequently copies the stored events in the back channel events log file to the card. The receiver provides an indication (e.g., indication on the visual display) when the copying is complete. The user subsequently returns recorded cards 1306 to the service provider who then inserts the cards into card reader 1308. In one embodiment, reader 1308 is configured with eight conventional reading units that allow data to be read from SMARTMEDIA® cards 1306. In this embodiment the reading units are the same as recorder unit 232, although other reading units can be used in other embodiments. Data from reader 1308 is routed through conventional computer 1310 and is stored in conventional database 1312 that is maintained on a computer (e.g., computer 1310 or a separate conventional computer). The service provider may then access the back channel events stored in database 1312 using, for example, a structured query language (SQL) database program such as MICROSOFT ACCESS® or ORACLE SQL®. The back channel information is then incorporated with other known information (stored for example in database 1312) about the users to analyze user behavior across specific sub-populations (e.g., to determine how often women users demand and play back sports programs, or to determine if a particular program is the highest rated program in a specific sub-population). Once analysis is complete, computer 1310 outputs report 1314 to the service provider.

Figure 14:
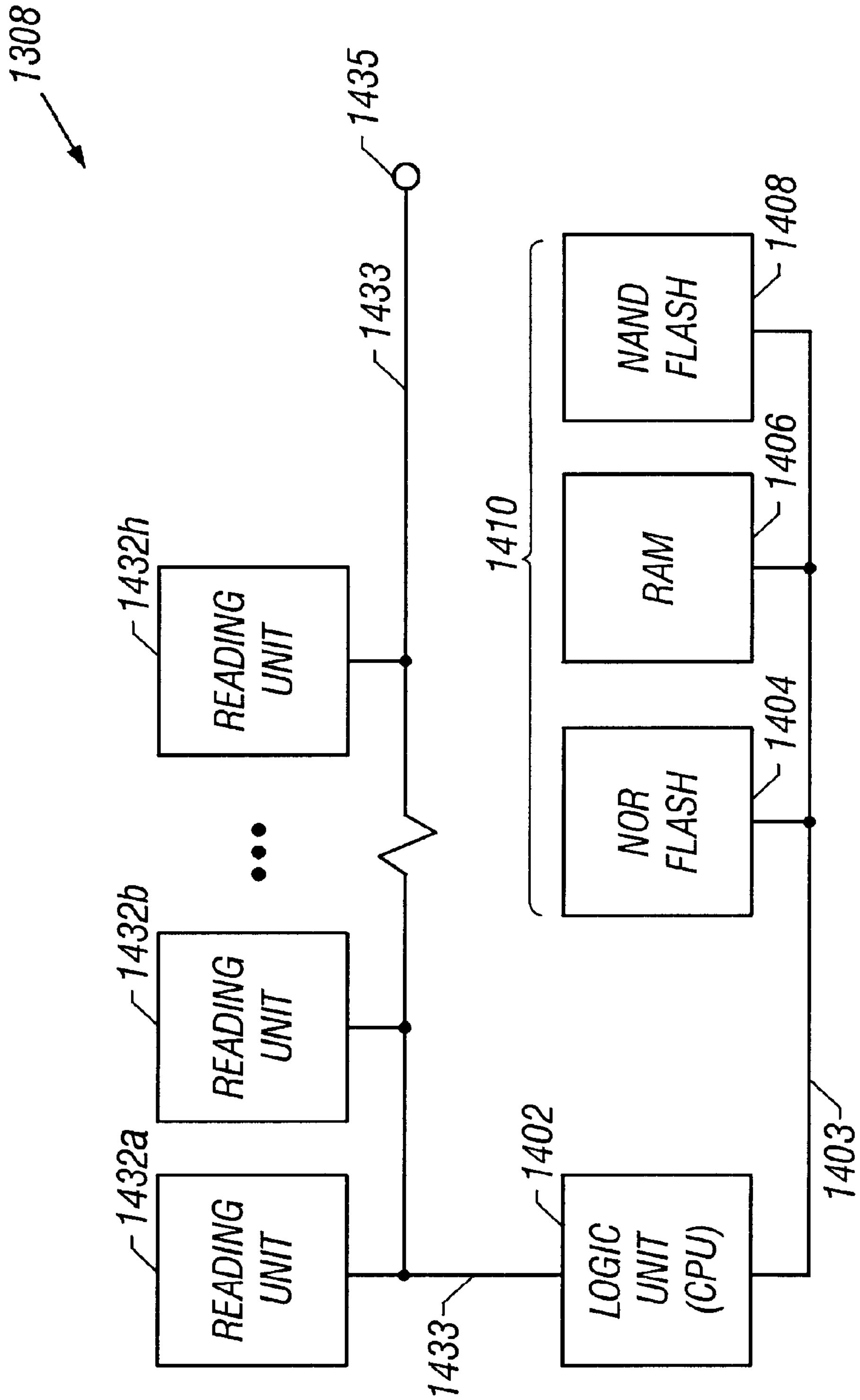
FIG. 14 is a diagram illustrating an embodiment of a card reader.

FIG. 14 is a diagrammatic view of one embodiment of card reader 1308. In the embodiment shown in FIG. 14, reader 1308 is a modified Command Audio Corporation CA-1000 board typically used in receiver 116 (FIG. 1) that includes eight reading units that are the same type as recording unit 232 (FIG. 2). Logic unit 1402 is electrically coupled to conventional NOR flash memory 1404, conventional RAM 1406, and conventional NAND flash memory 1408. The memories 1404, 1406, 1408 together are included in memory 1410. Logic unit 1402 is electrically coupled to eight reading units 1432*a*–1432*h* via line 1433. Terminal 1435 (e.g., conventional eight-channel serial cable connector) is coupled to line 1433 so that information stored on media cards inserted into reading units 1432*a*–1432*h* can be accessed by an outside computer (e.g., computer 1310). Since in this embodiment a modified Command Audio Corporation receiver card is used, elements 1402, 1403, 1404, 1406, 1408, 1410, 1432*a*, 1433, and 1435 are analogous to elements 202, 203, 204, 206, 208, 210, 232, 233, and 235, respectively, as shown in FIG. 2.

Specific embodiments have been disclosed above. Persons skilled in the art will understand, however, that many variations of these specific embodiments exist. Therefore, the invention is limited only by the scope of the following claims.

We claim:

1. A method of structuring a wireless signal, comprising the acts of:

providing a first program, wherein the first program comprises first audio content for local storage and playback in a wireless receiver, wherein a first segment is defined in the first program, and wherein the first segment comprises a header and a portion of the first audio content;

providing a second program, wherein the second program comprises second audio content for local storage and playback in the wireless receiver, wherein a second segment is defined in the second program, and wherein the second segment comprises a header and a portion of the second audio content;

assembling a frame for broadcasting, wherein the frame comprises a portion of the first audio content in the first segment, a portion of the second audio content in the second segment, and a header;

inserting a first metadata parameter into the header of the first segment and into the header of the frame, wherein the first metadata parameter is associated with capture, reassembly, storage, or playback of the first audio content by the receiver; and inserting a second metadata parameter into the header of the second segment and into the header of the frame, wherein the second metadata parameter is associated with capture, reassembly, storage, or playback of the second audio content by the receiver.

2. The method of claim 1, wherein the first and second metadata parameters are associated with program identification, segment number, content type, edition, segments per program, or Bytes per program.

3. The method of claim 1, wherein the portion of the first audio content in the first segment comprises a packet, wherein the packet comprises a header, and further comprising the act of inserting the first metadata parameter into the header of the packet.

4. The method of claim 3, wherein the first and second metadata parameters are associated with program identification, segment number, content type, edition, segments per program, or Bytes per program.

5. The method of claim 3 further comprising the act of inserting a third metadata parameter into the header of the first segment but not into the header of the packet, wherein the third metadata parameter is associated with capture, reassembly, storage, or playback of the first audio content by the receiver.

6. The method of claim 5:

wherein the first metadata parameter inserted into the header of the frame, into the header of the first segment, and into the header of the packet is associated with program identification, segment number, content type, edition, segments per program, or Bytes per program; and wherein the third metadata parameter inserted into the header of the first segment but not into the header of the packet is associated with earliest play time, expiration time, remaining play time, and Bytes per segment.

7. A method of structuring a wireless signal, comprising the acts of:

providing a first program, wherein the first program comprises first audio content for local storage and playback in a wireless receiver, wherein a first packet is defined in the first program, and wherein the first packet comprises a header and a portion of the first audio content;

providing a second program, wherein the second program comprises second audio content for local storage and playback in the wireless receiver, wherein a second packet is defined in the second program, and wherein the second packet comprises a header and a portion of the second audio content;

assembling a frame for broadcasting, wherein the frame comprises at least a portion of the first audio content in the first packet, at least a portion of the second audio content in the second packet, and a header;

inserting a first metadata parameter into the header of the first packet and into the header of the frame, wherein the first metadata parameter is associated with capture, reassembly, storage, or playback of the first audio content by the receiver; and inserting a second metadata parameter into the header of the second packet and into the header of the frame, wherein the second metadata parameter is associated with capture, reassembly, storage, or playback of the second audio content by the receiver.

8. The method of claim 7, wherein the first and second metadata parameters are associated with program identification, segment number of a segment in the program, packet number, packets per segment, content type, edition, segments per program, Bytes per packet, Bytes per program, number of transmissions of the program, or program repetition number.

9. A wireless broadcast signal comprising:

a first program, wherein the first program comprises first audio content for local storage and playback in a wireless receiver, wherein a first segment is defined in the first program, and wherein the first segment comprises a header and a portion of the first audio content;

a second program, wherein the second program comprises second audio content for local storage and playback in the wireless receiver, wherein a second segment is defined in the second program, and wherein the second segment comprises a header and a portion of the second audio content;

a frame for broadcasting, wherein the frame comprises at least a portion of the first audio content in the first segment, at least a portion of the second audio content in the second segment, and a header;

a first metadata parameter carried by the header of the first segment and the header of the frame, wherein the first metadata parameter is associated with capture, reassembly, storage, or playback of the first audio content by the receiver; and a second metadata parameter carried by the header of the second segment and the header of the frame, wherein the second metadata parameter is associated with capture, reassembly, storage, or playback of the second audio content by the receiver.

10. The signal of claim 9, wherein the first and second metadata parameters are associated with program identification, segment number, content type, edition, segments per program, or Bytes per program.

11. The signal of claim 9, wherein the portion of the first audio content in the first segment comprises a packet, wherein the packet comprises a header, and wherein the first metadata parameter is carried by the header of the packet.

12. The signal of claim 11, wherein the first and second metadata parameters are associated with program identification, segment number, content type, edition, segments per program, or Bytes per program.

13. The signal of claim 11 further comprising a third metadata parameter carried by the header of the first segment but not carried by the header of the packet, wherein the third metadata parameter is associated with capture, reassembly, storage, or playback of the first audio content by the receiver.

14. The signal of claim 13:

wherein the first metadata parameter carried by the header of the frame, by the header of the first segment, and by the header of the packet is associated with program identification, segment number, content type, edition, segments per program, or Bytes per program; and wherein the third metadata parameter carried by the header of the first segment but not by the header of the packet is associated with earliest play time, expiration time, remaining play time, and Bytes per segment.

15. A wireless broadcast signal comprising:

a first program, wherein the first program comprises first audio content for local storage and playback in a wireless receiver, wherein a first packet is defined in the first program, and wherein the first packet comprises a header and a portion of the first audio content;

a second program, wherein the second program comprises second audio content for local storage and playback in the wireless receiver, wherein a second packet is defined in the second program, and wherein the second packet comprises a header and a portion of the second audio content;

a frame for broadcasting, wherein the frame comprises at least a portion of the first audio content in the first packet, at least a portion of the second audio content in the second packet, and a header;

a first metadata parameter carried by the header of the first packet and the header of the frame, wherein the first metadata parameter is associated with capture, reassembly, storage, or playback of the first audio content by the receiver; and a second metadata parameter carried by the header of the second packet and the header of the frame, wherein the second metadata parameter is associated with capture, reassembly, storage, or playback of the second audio content by the receiver.

16. The signal of claim 15, wherein the first and second metadata parameters are associated with program identification, segment number of a segment in the program, packet number, packets per segment, content type, edition, segments per program, Bytes per packet, Bytes per program, number of transmissions of the program, or program repetition number.

17. A method of structuring a wireless signal, comprising the acts of:

providing a first program, wherein the first program comprises first software, wherein a first segment is defined in the first program, wherein the first segment comprises a header and at least a portion of the first software;

providing a second program, wherein the second program comprises either second software or audio content, wherein a second segment is defined in the second program, wherein the second segment comprises a header, and wherein the second segment comprises either at least a portion of the second software or at least a portion of the audio content;

assembling a frame for broadcasting, wherein the frame comprises a portion of the first software in the first segment, either a portion of the audio content or a portion of the second software in the second segment or the audio content in the second segment, and a header;

inserting a first metadata parameter into the header of the first segment and into the header of the frame, wherein the first metadata parameter is associated with capture, storage, or use of the first software by a wireless receiver; and inserting a second metadata parameter into the header of the second segment and into the header of the frame, wherein the second metadata parameter is associated with capture, reassembly, storage, or playback of either the second software or the audio content by the receiver;

wherein the first and second software is associated with capture, reassembly, storage, or playback of audio content by the receiver, and wherein the audio content is for local storage and playback in the receiver.

18. The method of claim 17, wherein the portion of the first software in the first segment comprises a packet, wherein the packet comprises a header, and further comprising the act of inserting the first metadata parameter into the header of the packet.

19. A method of structuring a wireless signal, comprising the acts of:

providing a first program, wherein the first program comprises first software, wherein a first packet is defined in the first program, wherein the first packet comprises a header and at least a portion of the first software;

providing a second program, wherein the second program comprises either second software or audio content, wherein a second packet is defined in the second program, wherein the second packet comprises a header, and wherein the second packet comprises either at least a portion of the second software or at least a portion of the audio content;

assembling a frame for broadcasting, wherein the frame comprises a portion of the first software in the first packet, either a portion of the audio content or a portion of the second software in the second packet, and a header;

inserting a first metadata parameter into the header of the first packet and into the header of the frame, wherein the first metadata parameter is associated with capture, storage, or use of the first software by a wireless receiver; and inserting a second metadata parameter into the header of the second packet and into the header of the frame, wherein the second metadata parameter is associated with capture, reassembly, storage, or playback of either the second software or the audio content by the receiver;

wherein the first and second software is associated with capture, reassembly, storage, or playback of audio content by the receiver, and wherein the audio content is for local storage and playback in the receiver.

20. A wireless broadcast signal comprising:

a first program, wherein the first program comprises first software, wherein a first segment is defined in the first program, wherein the first segment comprises a header and at least a portion of the first software;

a second program, wherein the second program comprises either second software or audio content, wherein a second segment is defined in the second program, wherein the second segment comprises a header, and wherein the second segment comprises either at least a portion of the second software or at least a portion of the audio content;

a frame for broadcasting, wherein the frame comprises a portion of the first software in the first segment, either a portion of the audio content or a portion of the second software in the second segment or the audio content in the second segment, and a header;

a first metadata parameter carried by the header of the first segment and the header of the frame, wherein the first metadata parameter is associated with capture, storage, or use of the first software by a wireless receiver; and a second metadata parameter carried by the header of the second segment and the header of the frame, wherein the second metadata parameter is associated with capture, reassembly, storage, or playback of either the second software or the audio content by the receiver;

wherein the first and second software is associated with capture, reassembly, storage, or playback of audio content by the receiver, and wherein the audio content is for local storage and playback in the receiver.

21. The signal of claim 20, wherein the portion of the software in the first segment comprises a packet, wherein the packet comprises a header, and wherein the first metadata parameter is carried by the header of the packet.

22. A wireless broadcast signal comprising:

a first program, wherein the first program comprises first software, wherein a first packet is defined in the first program, wherein the first packet comprises a header and at least a portion of the first software;

a second program, wherein the second program comprises either second software or audio content, wherein a second packet is defined in the second program, wherein the second packet comprises a header, and wherein the second packet comprises either at least a portion of the second software or at least a portion of the audio content;

a frame for broadcasting, wherein the frame comprises a portion of the first software in the first packet, either a portion of the audio content or a portion of the second software in the second packet, and a header;

a first metadata parameter carried by the header of the first packet and the header of the frame, wherein the first metadata parameter is associated with capture, storage, or use of the first software by a wireless receiver; and a second metadata parameter carried by the header of the second packet and the header of the frame, wherein the second metadata parameter is associated with capture, reassembly, storage, or playback of either the second software or the audio content by the receiver;

wherein the first and second software is associated with capture, reassembly, storage, or playback of audio content by the receiver, and wherein the audio content is for local storage and playback in the receiver.

* * * * *